US011327153B2

(12) United States Patent
Campbell et al.

(10) Patent No.: US 11,327,153 B2
(45) Date of Patent: May 10, 2022

(54) MOTION COMPENSATION IN RADAR SYSTEM FOR AUTONOMOUS VEHICLE

(71) Applicant: Waymo LLC, Mountain View, CA (US)

(72) Inventors: Timothy Campbell, Mountain View, CA (US); Kevin Duncklee, Mountain View, CA (US)

(73) Assignee: Waymo LLC, Mountain View, CA (US)

( * ) Notice: Subject to any disclaimer, the term of this patent is extended or adjusted under 35 U.S.C. 154(b) by 274 days.

(21) Appl. No.: 16/589,271

(22) Filed: Oct. 1, 2019

(65) Prior Publication Data
US 2021/0096214 A1 Apr. 1, 2021

(51) Int. Cl.
*G01S 7/40* (2006.01)
*G01S 13/931* (2020.01)

(52) U.S. Cl.
CPC .............. *G01S 7/40* (2013.01); *G01S 7/4021* (2013.01); *G01S 13/931* (2013.01); *G01S 2013/93273* (2020.01)

(58) Field of Classification Search
CPC ........ G01S 13/931; G01S 7/40; G01S 7/4021; G01S 13/878; G01S 2013/93273
See application file for complete search history.

(56) References Cited

U.S. PATENT DOCUMENTS

| 2017/0123059 | A1* | 5/2017 | Asanuma | G01S 13/343 |
| 2020/0191935 | A1* | 6/2020 | Mende | G01S 13/347 |
| 2020/0292665 | A1* | 9/2020 | Behrens | G01S 13/584 |
| 2021/0181329 | A1* | 6/2021 | Kashiwagi | G01S 13/46 |

* cited by examiner

*Primary Examiner* — Timothy X Pham
(74) *Attorney, Agent, or Firm* — McDonnell Boehnen Hulbert & Berghoff LLP

(57) ABSTRACT

In another example, a method is provided that includes transmitting a first radar signal by a first channel of a plurality of channels of a radar unit. The method also includes receiving first radar reflections of the first radar signal by at least one reception antenna of the radar unit. Additionally, the method includes transmitting a second radar signal by the first channel. The method further includes receiving second radar reflections of the second radar signal by at least one reception antenna. Yet further, the method includes processing the received radar reflections from the first and second radar reflections to determine a platform movement parameter. Additionally, a virtual array may be constructed and radar signals received at common location of the virtual array may be used to determine a platform movement parameter. Moreover, the method includes operating the radar unit based on an offset determined from the platform movement parameter.

20 Claims, 10 Drawing Sheets

MOTION COMPENSATION IN RADAR SYSTEM FOR AUTONOMOUS VEHICLE

BACKGROUND

Unless otherwise indicated herein, the materials described in this section are not prior art to the claims in this application and are not admitted to be prior art by inclusion in this section.

Radio detection and ranging (RADAR) systems can be used to actively estimate range, angle, and/or Doppler frequency shift to environmental features by emitting radio signals and detecting returning reflected signals. Distances to radio-reflective features can be determined according to the time delay between transmission and reception. The radar system can emit a signal that varies in frequency over time, such as a signal with a time-varying frequency ramp, and then relate the difference in frequency between the emitted signal and the reflected signal to a range estimate. Some systems may also estimate relative motion of reflective objects based on Doppler frequency shifts in the received reflected signals.

In some examples, directional antennas can be used for the transmission and/or reception of signals to associate each range estimate with a bearing. More generally, directional antennas can also be used to focus radiated energy on a given field of view of interest. Combining the measured distances and the directional information allows for the surrounding environment features to be mapped. In other examples, non-directional antennas can be alternatively used. In these examples, a receiving antenna may have a 90 degree field of view, and may be configured to utilize multiple channels with a phase offset to determine angle of arrival of the received signal. The radar sensor can thus be used, for instance, by an autonomous vehicle control system to avoid obstacles indicated by the sensor information.

Some example automotive radar systems may be configured to operate at an electromagnetic wave frequency range of 76-77 Giga-Hertz (GHz). These radar systems may use transmission antennas that can to focus the radiated energy into tight beams in order to enable receiving antennas (e.g., having wide angle beams) in the radar system to measure an environment of the vehicle with high accuracy.

SUMMARY

In one example, a radar system is provided. The radar system includes a radar unit comprising a plurality of physical channels. The radar unit is configured to transmit a radar signal by a given channel of the plurality of channels and is also configured to receive radar reflections. The radar system also includes a radar processing system. The radar processing system is configured to cause a plurality of transmissions of radar signals by the radar unit, each transmission of the plurality of transmissions being transmitted by one of the plurality of channels, where the plurality of transmissions of radar signals are transmitted in a predetermined channel order and wherein two consecutive transmissions are transmitted by one channel of the plurality of channels. The radar processing system is also configured to process received radar reflections from the two consecutive transmissions that are transmitted by one channel of the plurality of channels to determine a platform movement parameter. Additionally, the radar processing system is configured to operate the radar system based on an offset determined from the platform movement parameter.

In another example, a method is provided that includes transmitting a first radar signal by a first channel of a plurality of channels of a radar unit. The method also includes receiving first radar reflections of the first radar signal by at least one reception antenna of the radar unit. Additionally, the method includes transmitting a second radar signal by the first channel of a plurality of channels of the radar unit. The method further includes receiving second radar reflections of the second radar signal by at least one reception antenna of the radar unit. Yet further, the method includes processing the received radar reflections from the first and second radar reflections to determine a platform movement parameter. Moreover, the method includes operating the radar unit based on an offset determined from the platform movement parameter.

In yet another example, a non-transitory computer readable medium having stored thereon executable instructions that, upon execution by a computing device, cause the computing device to perform functions is provided. The functions include causing the transmission of a first radar signal by a first channel of a plurality of channels of a radar unit. The functions further include receiving first radar reflections of the first radar signal. The functions also include causing the transmission of a second radar signal by the first channel of a plurality of channels of the radar unit. Additionally, the functions include receiving second radar reflections. Yet further, the functions include processing the received radar reflections from the first and second radar reflections to determine a platform movement parameter. Moreover, the functions include operating the radar unit based on an offset determined from the platform movement parameter.

In another example, a system is provided that includes means for transmitting a first radar signal by a first channel of a plurality of channels of a radar unit. The system also includes means for receiving first radar reflections of the first radar signal by at least one reception antenna of the radar unit. Additionally, the system includes means for transmitting a second radar signal by the first channel of a plurality of channels of the radar unit. The system further includes means for receiving second radar reflections of the second radar signal by at least one reception antenna of the radar unit. Yet further, the system includes means for processing the received radar reflections from the first and second radar reflections to determine a platform movement parameter. Moreover, the system includes means for operating the radar unit based on an offset determined from the platform movement parameter.

These as well as other aspects, advantages, and alternatives, will become apparent to those of ordinary skill in the art by reading the following detailed description, with reference where appropriate to the accompanying figures.

DETAILED DESCRIPTION

Figure 1:
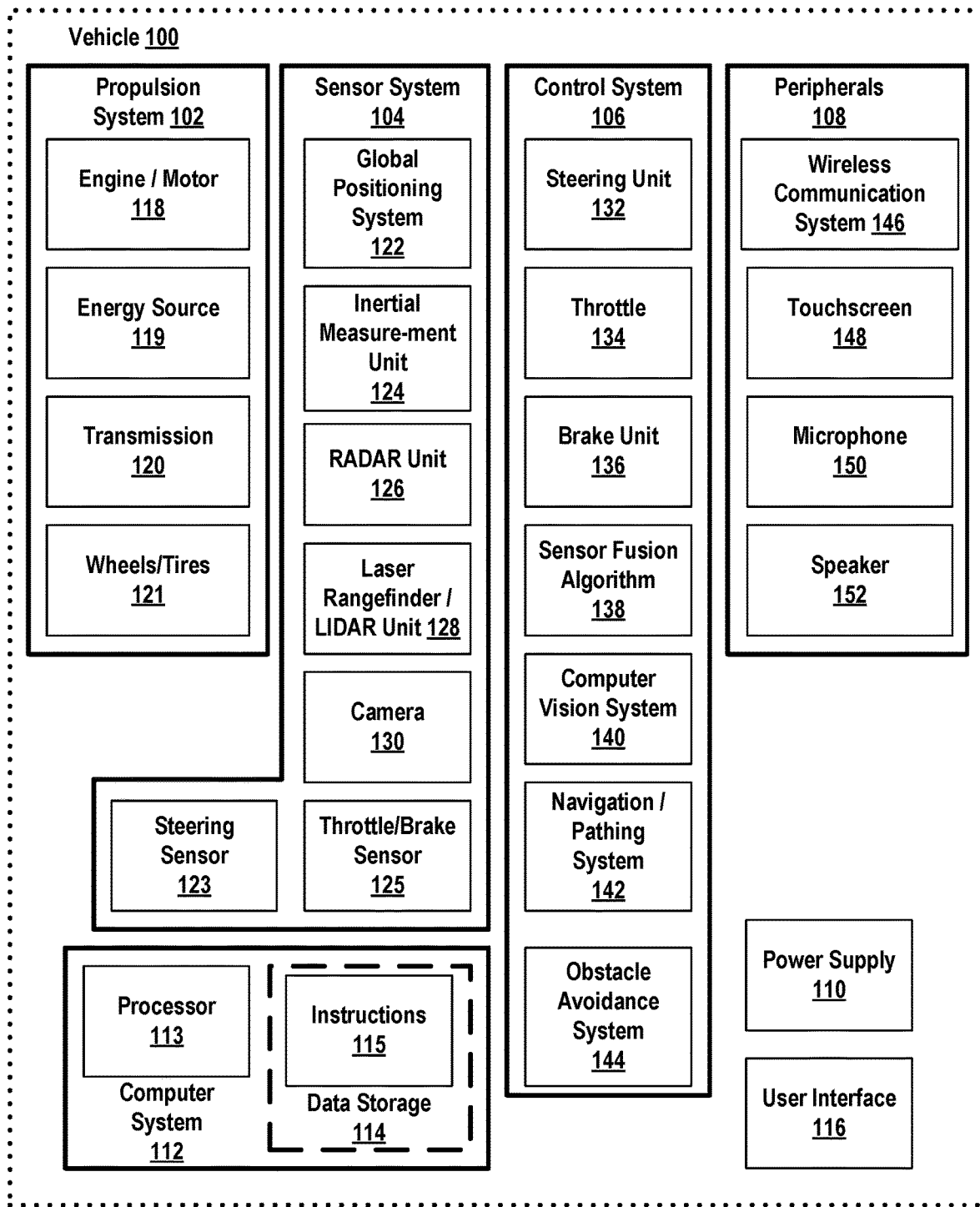
FIG. 1 is a functional block diagram depicting aspects of an example autonomous vehicle.

The following detailed description describes various features and functions of the disclosed systems and methods with reference to the accompanying figures. In the figures, similar symbols identify similar components, unless context dictates otherwise. The illustrative system, device and method embodiments described herein are not meant to be limiting. It may be readily understood by those skilled in the art that certain aspects of the disclosed systems, devices and methods can be arranged and combined in a wide variety of different configurations, all of which are contemplated herein.

There are continued efforts to improve vehicle safety, including the development of autonomous vehicles equipped with accident-avoidance systems designed to avoid or reduce the likelihood of accidents. Various sensors, such as radio detection and ranging (RADAR) sensors and light detection and ranging (LIDAR) sensors among other possibilities, may be included on an autonomous vehicle to detect obstacles and/or other vehicles in the surrounding environment to facilitate accident avoidance. However, as more vehicles adopt such accident-avoidance systems and the density of sensor equipped vehicles continues to increase, interference between the sensors may reduce the accuracy and effectiveness of the sensors used for accident avoidance.

Conventional radar systems are often configured to use a single radar transmission channel and a single radar reception channel. Within example systems and methods presented herein, a radar system may be a multiple-input multiple-output (MIMO), multiple-input single-output (MISO), or single-input multiple-output (SIMO) radar system. In these radar systems, multiple physical channels (i.e., separate antennas or arrays) may be used on the transmit side, receive side, or both the transmit and receive side. During the operation of a radar system, the radar system may transmit and receive multiple radar pulses. In some examples, the radar system may vary the physical channel on which radar signals are transmitted and received (i.e., switch between physical channels).

While MIMO, MISO, and SIMO radar configurations may offer many benefits over a conventional single channel radar, these radar systems may also introduce an ambiguity that can occur during motion of the vehicle. Particularly, if a different antenna or array of the multiple antennas or arrays is used for a subsequent signal pulse as the vehicle moves, the radar system may have trouble determining if received radar reflections are different for the subsequent signal pulse compared to the first signal pulse. The processing trouble may arise due to the movement of the vehicle on which the radar units are mounted and/or from the different location of the physical channel of the radar unit. In addition, it may be computationally intensive and potentially inaccurate to make movement assumptions based on radar signals received from two different radar channels. Thus, it may be desirable to operate a radar system in a manner that can reduce this ambiguity.

The present disclosure describes both example radar systems and modes of operating a radar system to mitigate this ambiguity. In practice, the present systems and methods may be configured to determine a movement parameter for a vehicle equipped with a radar system that includes multiple physical radar channels. In some examples, the present systems and methods may determine a platform movement parameter by transmitting or receiving two subsequent radar pulses on the same physical channel. Thus, any changes in reflections may be attributed to the movement of the platform and not the change in the location of the physical radar channel. Based on the radar reflections from these two signals, the radar system may be able to determine a platform movement parameter that characterizes the movement of the vehicle. The platform movement parameter may include a velocity of the vehicle, and/or speed and direction information about the vehicle. The vehicle may subsequently operate the radar system based on this determined platform movement parameter.

In some examples, a processor of the vehicle may be configured to determine the movement parameter. As part of determining the movement parameter, the processor may identify a static object in the first set of radar data, such as a tree, a street sign, etc. When the radar unit receives the second set of radar reflections, the processor may identify reflections associated with the static object and determine the movement parameter based on the difference between the two radar reflections of the static object.

Additionally, in some instances, the radar system may operate for a predetermined period of time using the assumed platform movement parameter. In some examples, the processor may periodically update the platform movement parameter. For example, the platform movement parameter may be updated after a predetermined amount of time (e.g., every few minutes), after a number of transmissions by radar, or based on other criteria as well. The embodiments disclosed herein may be used on any type of vehicle, including conventional automobiles and automobiles having an autonomous mode of operation. However, the term "vehicle" is to be broadly construed to cover any moving object, including, for instance, a truck, a van, a semitrailer truck, a motorcycle, a golf cart, an off-road vehicle, a warehouse transport vehicle, or a farm vehicle, as well as a carrier that rides on a track such as a rollercoaster, trolley, tram, or train car, among other examples. Furthermore, although example vehicles are shown and described as vehicles that may be configured to operate in autonomous mode, the embodiments described herein are also applicable to vehicles that are not configured to operate autonomously. Thus, the example vehicles are not meant to limit the present disclosure to autonomous vehicles.

FIG. 1 is a functional block diagram illustrating a vehicle 100 according to an example embodiment. The vehicle 100 is configured to operate fully or partially in an autonomous mode, and thus may be referred to as an "autonomous vehicle." For example, a computer system 112 can control the vehicle 100 while in an autonomous mode via control instructions to a control system 106 for the vehicle 100. The computer system 112 can receive information from one or more sensor systems 104, and base one or more control processes (such as setting a heading so as to avoid a detected obstacle) upon the received information in an automated fashion.

The autonomous vehicle 100 can be fully autonomous or partially autonomous. In a partially autonomous vehicle some functions can optionally be manually controlled (e.g., by a driver) some or all of the time. Further, a partially autonomous vehicle can be configured to switch between a fully-manual operation mode and a partially-autonomous and/or a fully-autonomous operation mode.

The vehicle 100 includes a propulsion system 102, a sensor system 104, a control system 106, one or more peripherals 108, a power supply 110, a computer system 112, and a user interface 116. The vehicle 100 may include more or fewer subsystems and each subsystem can optionally include multiple components. Further, each of the subsystems and components of vehicle 100 can be interconnected and/or in communication. Thus, one or more of the functions of the vehicle 100 described herein can optionally be divided between additional functional or physical components, or combined into fewer functional or physical components. In some further examples, additional functional and/or physical components may be added to the examples illustrated by FIG. 1.

The propulsion system 102 can include components operable to provide powered motion to the vehicle 100. In some embodiments the propulsion system 102 includes an engine/motor 118, an energy source 119, a transmission 120, and wheels/tires 121. The engine/motor 118 converts energy source 119 to mechanical energy. In some embodiments, the propulsion system 102 can optionally include one or both of engines and/or motors. For example, a gas-electric hybrid vehicle can include both a gasoline/diesel engine and an electric motor.

The energy source 119 represents a source of energy, such as electrical and/or chemical energy, that may, in full or in part, power the engine/motor 118. That is, the engine/motor 118 can be configured to convert the energy source 119 to mechanical energy to operate the transmission. In some embodiments, the energy source 119 can include gasoline, diesel, other petroleum-based fuels, propane, other compressed gas-based fuels, ethanol, solar panels, batteries, capacitors, flywheels, regenerative braking systems, and/or other sources of electrical power, etc. The energy source 119 can also provide energy for other systems of the vehicle 100.

The transmission 120 includes appropriate gears and/or mechanical elements suitable to convey the mechanical power from the engine/motor 118 to the wheels/tires 121. In some embodiments, the transmission 120 includes a gearbox, a clutch, a differential, a drive shaft, and/or axle(s), etc.

The wheels/tires 121 are arranged to stably support the vehicle 100 while providing frictional traction with a surface, such as a road, upon which the vehicle 100 moves. Accordingly, the wheels/tires 121 are configured and arranged according to the nature of the vehicle 100. For example, the wheels/tires can be arranged as a unicycle, bicycle, motorcycle, tricycle, or car/truck four-wheel format. Other wheel/tire geometries are possible, such as those including six or more wheels. Any combination of the wheels/tires 121 of vehicle 100 may be operable to rotate differentially with respect to other wheels/tires 121. The wheels/tires 121 can optionally include at least one wheel that is rigidly attached to the transmission 120 and at least one tire coupled to a rim of a corresponding wheel that makes contact with a driving surface. The wheels/tires 121 may include any combination of metal and rubber, and/or other materials or combination of materials.

The sensor system 104 generally includes one or more sensors configured to detect information about the environment surrounding the vehicle 100. For example, the sensor system 104 can include a Global Positioning System (GPS) 122, an inertial measurement unit (IMU) 124, a RADAR unit 126, a laser rangefinder/LIDAR unit 128, a camera 130, and/or a microphone 131. The sensor system 104 could also include sensors configured to monitor internal systems of the vehicle 100 (e.g., 02 monitor, fuel gauge, engine oil temperature, wheel speed sensors, etc.). One or more of the sensors included in sensor system 104 could be configured to be actuated separately and/or collectively in order to modify a position and/or an orientation of the one or more sensors.

The GPS 122 is a sensor configured to estimate a geographic location of the vehicle 100. To this end, GPS 122 can include a transceiver operable to provide information regarding the position of the vehicle 100 with respect to the Earth.

The IMU 124 can include any combination of sensors (e.g., accelerometers and gyroscopes) configured to sense position and orientation changes of the vehicle 100 based on inertial acceleration.

The RADAR unit 126 can represent a system that utilizes radio signals to sense objects within the local environment of the vehicle 100. In some embodiments, in addition to sensing the objects, the RADAR unit 126 and/or the computer system 112 can additionally be configured to sense the speed and/or heading of the objects.

Similarly, the laser rangefinder or LIDAR unit 128 can be any sensor configured to sense objects in the environment in which the vehicle 100 is located using lasers. The laser rangefinder/LIDAR unit 128 can include one or more laser sources, a laser scanner, and one or more detectors, among other system components. The laser rangefinder/LIDAR unit 128 can be configured to operate in a coherent (e.g., using heterodyne detection) or an incoherent detection mode.

The camera 130 can include one or more devices configured to capture a plurality of images of the environment surrounding the vehicle 100. The camera 130 can be a still camera or a video camera. In some embodiments, the camera 130 can be mechanically movable such as by rotating and/or tilting a platform to which the camera is mounted. As such, a control process of vehicle 100 may be implemented to control the movement of camera 130.

The sensor system 104 can also include a microphone 131. The microphone 131 can be configured to capture sound from the environment surrounding vehicle 100. In some cases, multiple microphones can be arranged as a microphone array, or possibly as multiple microphone arrays.

The control system 106 is configured to control operation(s) regulating acceleration of the vehicle 100 and its components. To effect acceleration, the control system 106 includes a steering unit 132, throttle 134, brake unit 136, a sensor fusion algorithm 138, a computer vision system 140, a navigation/pathing system 142, and/or an obstacle avoidance system 144, etc.

The steering unit 132 is operable to adjust the heading of vehicle 100. For example, the steering unit can adjust the axis (or axes) of one or more of the wheels/tires 121 so as to effect turning of the vehicle. The throttle 134 is configured to control, for instance, the operating speed of the engine/motor 118 and, in turn, adjust forward acceleration of the vehicle 100 via the transmission 120 and wheels/tires 121. The brake unit 136 decelerates the vehicle 100. The brake unit 136 can use friction to slow the wheels/tires 121. In some embodiments, the brake unit 136 inductively decelerates the wheels/tires 121 by a regenerative braking process to convert kinetic energy of the wheels/tires 121 to electric current.

The sensor fusion algorithm 138 is an algorithm (or a computer program product storing an algorithm) configured to accept data from the sensor system 104 as an input. The data may include, for example, data representing information sensed at the sensors of the sensor system 104. The sensor fusion algorithm 138 can include, for example, a Kalman filter, Bayesian network, etc. The sensor fusion algorithm 138 provides assessments regarding the environment surrounding the vehicle based on the data from sensor system 104. In some embodiments, the assessments can include evaluations of individual objects and/or features in the environment surrounding vehicle 100, evaluations of particular situations, and/or evaluations of possible interference between the vehicle 100 and features in the environment (e.g., such as predicting collisions and/or impacts) based on the particular situations.

The computer vision system 140 can process and analyze images captured by camera 130 to identify objects and/or features in the environment surrounding vehicle 100. The detected features/objects can include traffic signals, roadway boundaries, other vehicles, pedestrians, and/or obstacles, etc. The computer vision system 140 can optionally employ an object recognition algorithm, a Structure From Motion (SFM) algorithm, video tracking, and/or available computer vision techniques to effect categorization and/or identification of detected features/objects. In some embodiments, the computer vision system 140 can be additionally configured to map the environment, track perceived objects, estimate the speed of objects, etc.

The navigation and pathing system 142 is configured to determine a driving path for the vehicle 100. For example, the navigation and pathing system 142 can determine a series of speeds and directional headings to effect movement of the vehicle along a path that substantially avoids perceived obstacles while generally advancing the vehicle along a roadway-based path leading to an ultimate destination, which can be set according to user inputs via the user interface 116, for example. The navigation and pathing system 142 can additionally be configured to update the driving path dynamically while the vehicle 100 is in operation on the basis of perceived obstacles, traffic patterns, weather/road conditions, etc. In some embodiments, the navigation and pathing system 142 can be configured to incorporate data from the sensor fusion algorithm 138, the GPS 122, and one or more predetermined maps so as to determine the driving path for vehicle 100.

The obstacle avoidance system 144 can represent a control system configured to identify, evaluate, and avoid or otherwise negotiate potential obstacles in the environment surrounding the vehicle 100. For example, the obstacle avoidance system 144 can effect changes in the navigation of the vehicle by operating one or more subsystems in the control system 106 to undertake swerving maneuvers, turning maneuvers, braking maneuvers, etc. In some embodiments, the obstacle avoidance system 144 is configured to automatically determine feasible ("available") obstacle avoidance maneuvers on the basis of surrounding traffic patterns, road conditions, etc. For example, the obstacle avoidance system 144 can be configured such that a swerving maneuver is not undertaken when other sensor systems detect vehicles, construction barriers, other obstacles, etc. in the region adjacent the vehicle that would be swerved into. In some embodiments, the obstacle avoidance system 144 can automatically select the maneuver that is both available and maximizes safety of occupants of the vehicle. For example, the obstacle avoidance system 144 can select an avoidance maneuver predicted to cause the least amount of acceleration in a passenger cabin of the vehicle 100.

The vehicle 100 also includes peripherals 108 configured to allow interaction between the vehicle 100 and external sensors, other vehicles, other computer systems, and/or a user, such as an occupant of the vehicle 100. For example, the peripherals 108 for receiving information from occupants, external systems, etc. can include a wireless communication system 146, a touchscreen 148, a microphone 150, and/or a speaker 152.

In some embodiments, the peripherals 108 function to receive inputs for a user of the vehicle 100 to interact with the user interface 116. To this end, the touchscreen 148 can both provide information to a user of vehicle 100, and convey information from the user indicated via the touchscreen 148 to the user interface 116. The touchscreen 148 can be configured to sense both touch positions and touch gestures from a user's finger (or stylus, etc.) via capacitive sensing, resistance sensing, optical sensing, a surface acoustic wave process, etc. The touchscreen 148 can be capable of sensing finger movement in a direction parallel or planar to the touchscreen surface, in a direction normal to the touchscreen surface, or both, and may also be capable of sensing a level of pressure applied to the touchscreen surface. An occupant of the vehicle 100 can also utilize a voice command interface. For example, the microphone 150 can be configured to receive audio (e.g., a voice command or other audio input) from a user of the vehicle 100. Similarly, the speakers 152 can be configured to output audio to the user of the vehicle 100.

In some embodiments, the peripherals 108 function to allow communication between the vehicle 100 and external systems, such as devices, sensors, other vehicles, etc. within its surrounding environment and/or controllers, servers, etc., physically located far from the vehicle that provide useful information regarding the vehicle's surroundings, such as traffic information, weather information, etc. For example, the wireless communication system 146 can wirelessly communicate with one or more devices directly or via a communication network. The wireless communication system 146 can optionally use 3G cellular communication, such as Code-Division Multiple Access (CDMA), Evolution-Data Optimized (EV-DO), Global System for Mobile communications (GSM)/General Packet Radio Surface (GPRS), and/or 4G cellular communication, such as Worldwide Interoperability for Microwave Access (WiMAX) or Long-Term Evolution (LTE). Additionally or alternatively, wireless communication system 146 can communicate with a wireless local area network (WLAN), for example, using WiFi. In some embodiments, wireless communication system 146 could communicate directly with a device, for example, using an infrared link, Bluetooth®, and/or ZigBee®. The wireless communication system 146 can include one or more dedicated short-range communication (DSRC) devices that can include public and/or private data communications between vehicles and/or roadside stations. Other wireless protocols for sending and receiving information embedded in signals, such as various vehicular communication systems, can also be employed by the wireless communication system 146 within the context of the present disclosure.

As noted above, the power supply 110 can provide power to components of vehicle 100, such as electronics in the peripherals 108, computer system 112, sensor system 104, etc. The power supply 110 can include a rechargeable lithium-ion or lead-acid battery for storing and discharging electrical energy to the various powered components, for example. In some embodiments, one or more banks of batteries can be configured to provide electrical power. In some embodiments, the power supply 110 and energy source 119 can be implemented together, as in some all-electric cars.

Many or all of the functions of vehicle 100 can be controlled via computer system 112 that receives inputs from the sensor system 104, peripherals 108, etc., and communicates appropriate control signals to the propulsion system 102, control system 106, peripherals 108, etc. to effect automatic operation of the vehicle 100 based on its surroundings. Computer system 112 includes at least one processor 113 (which can include at least one microprocessor) that executes instructions 115 stored in a non-transitory computer readable medium, such as the data storage 114. The computer system 112 may also represent a plurality of computing devices that serve to control individual components or subsystems of the vehicle 100 in a distributed fashion.

In some embodiments, data storage 114 contains instructions 115 (e.g., program logic) executable by the processor 113 to execute various functions of vehicle 100, including those described above in connection with FIG. 1. Data storage 114 may contain additional instructions as well, including instructions to transmit data to, receive data from, interact with, and/or control one or more of the propulsion system 102, the sensor system 104, the control system 106, and the peripherals 108.

In addition to the instructions 115, the data storage 114 may store data such as roadway maps, path information, among other information. Such information may be used by vehicle 100 and computer system 112 during operation of the vehicle 100 in the autonomous, semi-autonomous, and/or manual modes to select available roadways to an ultimate destination, interpret information from the sensor system 104, etc.

The vehicle 100, and associated computer system 112, provides information to and/or receives input from a user of vehicle 100, such as an occupant in a passenger cabin of the vehicle 100. The user interface 116 can accordingly include one or more input/output devices within the set of peripherals 108, such as the wireless communication system 146, the touchscreen 148, the microphone 150, and/or the speaker 152 to allow communication between the computer system 112 and a vehicle occupant.

The computer system 112 controls the operation of the vehicle 100 based on inputs received from various subsystems indicating vehicle and/or environmental conditions (e.g., propulsion system 102, sensor system 104, and/or control system 106), as well as inputs from the user interface 116, indicating user preferences. For example, the computer system 112 can utilize input from the control system 106 to control the steering unit 132 to avoid an obstacle detected by the sensor system 104 and the obstacle avoidance system 144. The computer system 112 can be configured to control many aspects of the vehicle 100 and its subsystems. Generally, however, provisions are made for manually overriding automated controller-driven operation, such as in the event of an emergency, or merely in response to a user-activated override, etc.

The components of vehicle 100 described herein can be configured to work in an interconnected fashion with other components within or outside their respective systems. For example, the camera 130 can capture a plurality of images that represent information about an environment of the vehicle 100 while operating in an autonomous mode. The environment may include other vehicles, traffic lights, traffic signs, road markers, pedestrians, etc. The computer vision system 140 can categorize and/or recognize various aspects in the environment in concert with the sensor fusion algorithm 138, the computer system 112, etc. based on object recognition models pre-stored in data storage 114, and/or by other techniques.

Although the vehicle 100 is described and shown in FIG. 1 as having various components of vehicle 100, e.g., wireless communication system 146, computer system 112, data storage 114, and user interface 116, integrated into the vehicle 100, one or more of these components can optionally be mounted or associated separately from the vehicle 100. For example, data storage 114 can exist, in part or in full, separate from the vehicle 100, such as in a cloud-based server, for example. Thus, one or more of the functional elements of the vehicle 100 can be implemented in the form of device elements located separately or together. The functional device elements that make up vehicle 100 can generally be communicatively coupled together in a wired and/or wireless fashion.

Figure 2A:
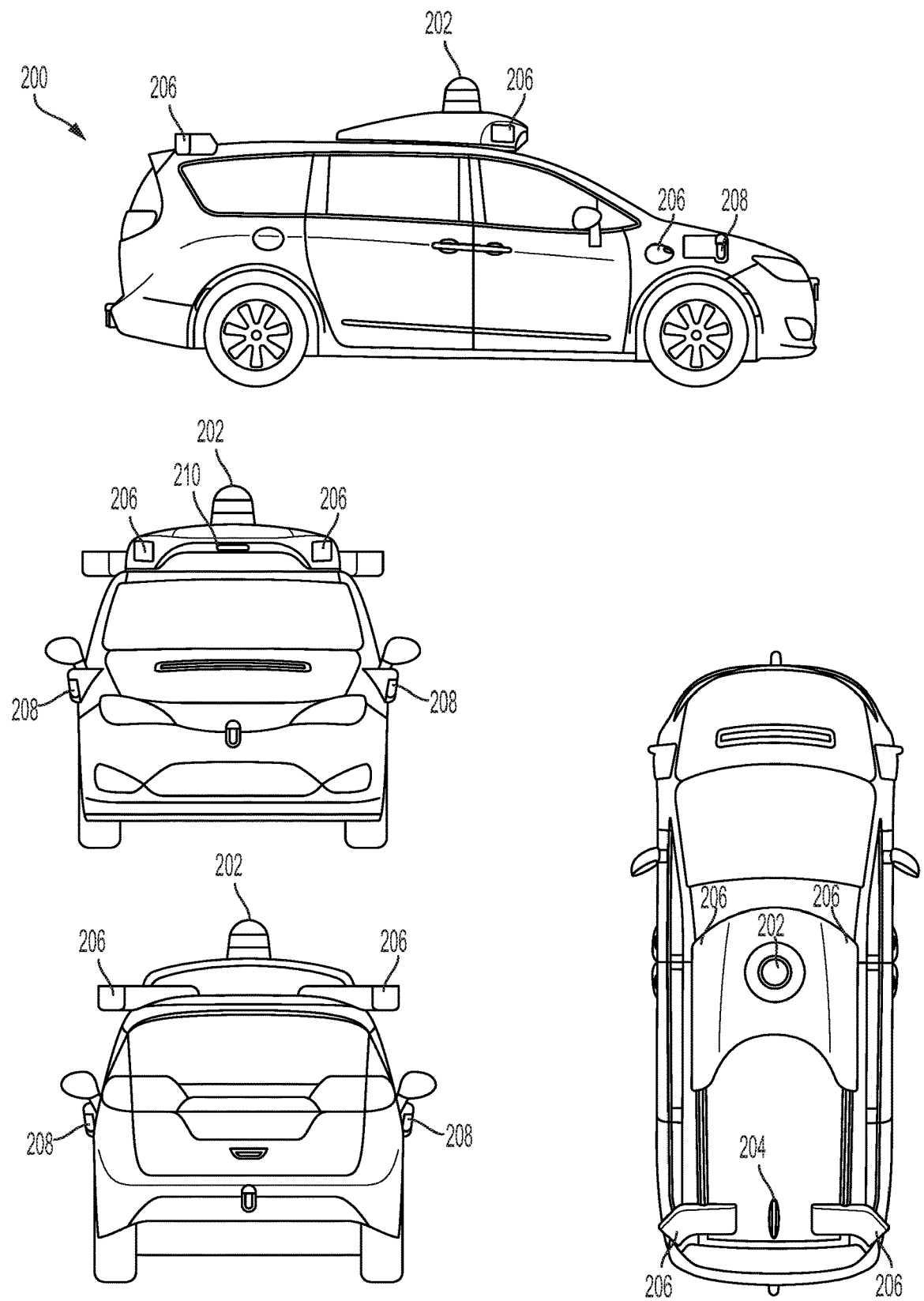
FIG. 2A depicts exterior views of an example autonomous vehicle.

FIG. 2A shows an example vehicle 200 that can include some or all of the functions described in connection with vehicle 100 in reference to FIG. 1. In particular, FIG. 2A shows various different views of vehicle 200. Although vehicle 200 is illustrated in FIG. 2A as a four-wheel van-type car for illustrative purposes, the present disclosure is not so limited. For instance, the vehicle 200 can represent a truck, a van, a semi-trailer truck, a motorcycle, a golf cart, an off-road vehicle, or a farm vehicle, etc.

The example vehicle 200 includes a sensor unit 202, a wireless communication system 204, RADAR units 206, laser rangefinder units 208, and a camera 210. Furthermore, the example vehicle 200 can include any of the components described in connection with vehicle 100 of FIG. 1. The RADAR unit 206 and/or laser rangefinder unit 208 can actively scan the surrounding environment for the presence of potential obstacles and can be similar to the RADAR unit 126 and/or laser rangefinder/LIDAR unit 128 in the vehicle 100.

The sensor unit 202 is mounted atop the vehicle 200 and includes one or more sensors configured to detect information about an environment surrounding the vehicle 200, and output indications of the information. For example, sensor unit 202 can include any combination of cameras, RADARs, LIDARs, range finders, and acoustic sensors. The sensor unit 202 can include one or more movable mounts that could be operable to adjust the orientation of one or more sensors in the sensor unit 202. In one embodiment, the movable mount could include a rotating platform that could scan sensors so as to obtain information from each direction around the vehicle 200. In another embodiment, the movable mount of the sensor unit 202 could be moveable in a scanning fashion within a particular range of angles and/or azimuths. The sensor unit 202 could be mounted atop the roof of a car, for instance, however other mounting locations are possible. Additionally, the sensors of sensor unit 202 could be distributed in different locations and need not be collocated in a single location. Some possible sensor types and mounting locations include RADAR unit 206 and laser rangefinder unit 208. Furthermore, each sensor of sensor unit 202 can be configured to be moved or scanned independently of other sensors of sensor unit 202.

In an example configuration, one or more RADAR scanners (e.g., the RADAR unit 206) can be located near the front of the vehicle 200, to actively scan the region in front of the car 200 for the presence of radio-reflective objects. A RADAR scanner can be situated, for example, in a location suitable to illuminate a region including a forward-moving path of the vehicle 200 without occlusion by other features of the vehicle 200. For example, a RADAR scanner can be situated to be embedded and/or mounted in or near the front bumper, front headlights, cowl, and/or hood, etc. Furthermore, one or more additional RADAR scanning devices can be located to actively scan the side and/or rear of the vehicle 200 for the presence of radio-reflective objects, such as by including such devices in or near the rear bumper, side panels, rocker panels, and/or undercarriage, etc.

The wireless communication system 204 could be located on the roof of the vehicle 200 as depicted in FIG. 2A. Alternatively, the wireless communication system 204 could be located, fully or in part, elsewhere. The wireless communication system 204 may include wireless transmitters and receivers that could be configured to communicate with devices external or internal to the vehicle 200. Specifically, the wireless communication system 204 could include transceivers configured to communicate with other vehicles and/or computing devices, for instance, in a vehicular communication system or a roadway station. Examples of such vehicular communication systems include dedicated short range communications (DSRC), radio frequency identification (RFID), and other proposed communication standards directed towards intelligent transport systems.

The camera 210 can be a photo-sensitive instrument, such as a still camera, a video camera, etc., that is configured to capture a plurality of images of the environment of the vehicle 200. To this end, the camera 210 can be configured to detect visible light, and can additionally or alternatively be configured to detect light from other portions of the spectrum, such as infrared or ultraviolet light. The camera 210 can be a two-dimensional detector, and can optionally have a three-dimensional spatial range of sensitivity. In some embodiments, the camera 210 can include, for example, a range detector configured to generate a two-dimensional image indicating distance from the camera 210 to a number of points in the environment. To this end, the camera 210 may use one or more range detecting techniques.

For example, the camera 210 can provide range information by using a structured light technique in which the vehicle 200 illuminates an object in the environment with a predetermined light pattern, such as a grid or checkerboard pattern and uses the camera 210 to detect a reflection of the predetermined light pattern from environmental surroundings. Based on distortions in the reflected light pattern, the vehicle 200 can determine the distance to the points on the object. The predetermined light pattern may comprise infrared light, or radiation at other suitable wavelengths for such measurements.

The camera 210 can be mounted inside a front windshield of the vehicle 200. Specifically, the camera 210 can be situated to capture images from a forward-looking view with respect to the orientation of the vehicle 200. Other mounting locations and viewing angles of camera 210 can also be used, either inside or outside the vehicle 200. Further, the camera 210 can have associated optics operable to provide an adjustable field of view. Further, the camera 210 can be mounted to vehicle 200 with a movable mount to vary a pointing angle of the camera 210, such as via a pan/tilt mechanism.

Figure 2B:
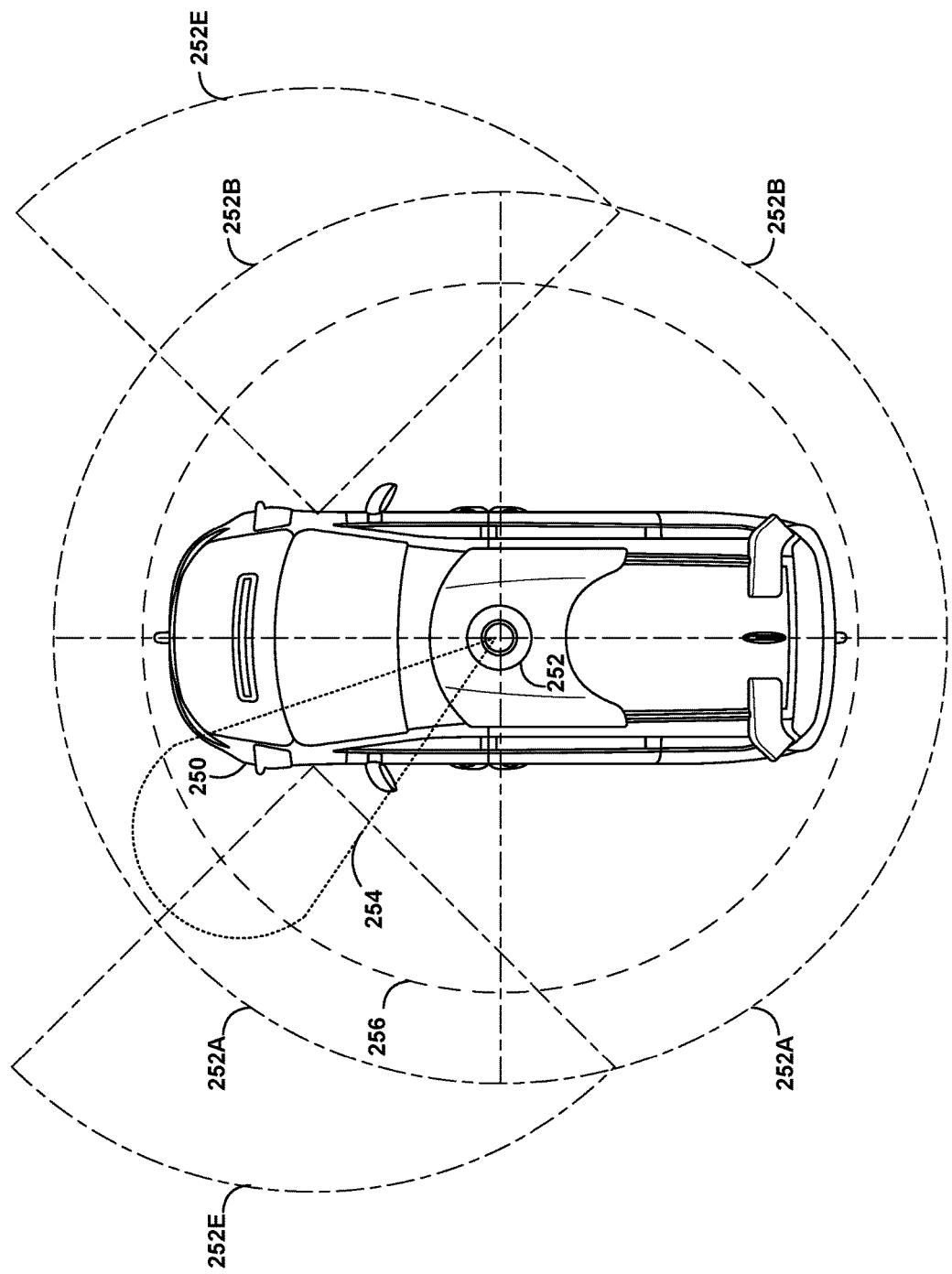
FIG. 2B depicts sensor fields of view of an example autonomous vehicle.

FIG. 2B illustrates an example autonomous vehicle 250 having various sensor fields of view. As previously discussed with respect to FIG. 2A, a vehicle 250 may contain a plurality of sensors. The locations of the various sensors may correspond to the locations of the sensors disclosed in FIG. 2A. However, in some instances, the sensors may have other locations. Sensors locations are omitted from FIG. 2B for simplicity of the drawing. For each sensor unit of vehicle 250, FIG. 2B shows a respective field of view. The field of view of a sensor may include an angular region over which the sensor may detect objects and a range that corresponds to maximum distance from the sensor at which the sensor may reliable detect objects.

A vehicle 250 may include six radar units. A first radar unit may be located on the front-left of the vehicle and have an angular field of view corresponding to the angular portion of field of view 252A. A second radar unit may be located on the front-right of the vehicle and have an angular field of view corresponding to the angular portion of field of view 252B. A third radar unit may be located on the rear-left of the vehicle and have an angular field of view corresponding to the angular portion of field of view 252C. A fourth radar unit may be located on the rear-right of the vehicle and have an angular field of view corresponding to the angular portion of field of view 252D. A fifth radar unit may be located on the left side of the vehicle and have an angular field of view corresponding to the angular portion of field of view 252E. A sixth radar unit may be located on the right side of the vehicle and have an angular field of view corresponding to the angular portion of field of view 252F. Each of the six radar units may be configured with a scannable beamwidth of 90 degrees. A radar beamwidth may be smaller than 90 degrees, but each radar unit may be able to steer the radar beam across the 90-degree field of view.

A first LIDAR unit of the vehicle 250 may be configured to scan the full 360-degree region around the vehicle as shown by an angular field of view corresponding to the angular portion of field of view 254. A second LIDAR unit of the vehicle 250 may be configured to scan a region smaller than the 360-degree region around the vehicle. In one example, the second LIDAR unit may have a field of view smaller than 10 degrees in the horizontal plant as shown by an angular field of view corresponding to the angular portion of field of view 254.

Additionally, the vehicle may also include at least one camera. The camera may be an optical camera and/or an infrared camera. The camera may have an angular field of view corresponding to the angular portion of field of view 258.

In addition to the field of view for each of the various sensors of vehicle 250, each sensor may also have a corresponding range. In one example, the range of the radar units may be greater than the range of either LIDAR unit, as shown by the field of the views of the radar units 252A-252E extending further than the fields of view for the LIDAR units 254 and 256. Additionally, the second LIDAR unit may have a range that is greater than a range of the first LIDAR unit, as shown by field of view 256 extending further than field of view 254. The camera may have a range shown by the extent of the field of view 258. In various examples, the range of the camera may be greater than or less than the range of the other sensors.

Figure 3:
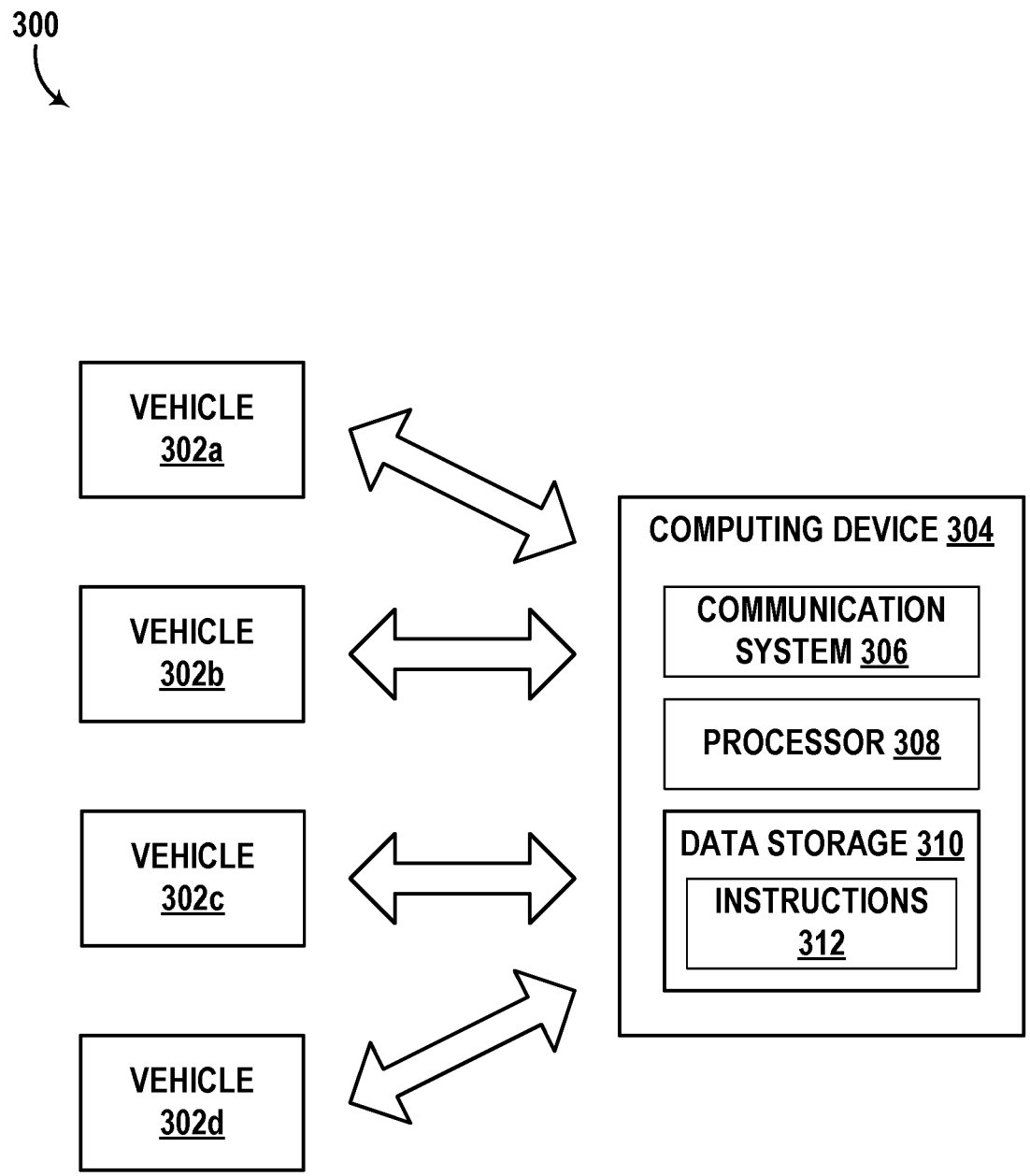
FIG. 3 is a simplified block diagram of a system, according to an example embodiment.

FIG. 3 is a simplified block diagram of a system 300, according to an example embodiment. The system 300 includes vehicles 302a-302d communicatively linked (e.g., via wired and/or wireless interfaces) to an external computing device 304. The vehicles 302a-302d and the computing device 304 may communicate within a network. Alternatively, the vehicles 302a-302d and the computing device 304 may each reside within a respective network.

The vehicles 302a-302d may be similar to the vehicles 100-200. For example, the vehicles 302a-302d may be partially or fully autonomous vehicles that each include one or more sensors (e.g., RADAR, etc.) to detect an environment of the vehicles 302a-302d. The vehicles 302a-302d may include components not shown in FIG. 3, such as a user interface, a communication interface, a processor, and data storage comprising instructions executable by the processor for carrying out one or more functions relating to the data sent to, or received by, the computing device 304. Further, the functions may also relate to control of the vehicles 302a-302d or components thereof, such as sensors, etc. To that end, the functions may also include methods and systems described herein.

The computing device 304 may be configured as a server or any other entity arranged to carry out the functions described herein. Further, the computing device 304 may be configured to send data/requests to the vehicles 302a-302d and/or to receive data from the vehicles 302a-302d. For example, the computing device 304 may receive location information from the vehicles 302a-302d as well as sensor configurations (e.g., direction, modulation pattern, etc.), and may responsively provide requests to proximate vehicles to adjust the corresponding sensor configurations (e.g., radar channel assignments). Additionally or alternatively, for example, the computing device 304 may function as a medium for sharing the data (e.g., sensor configurations, locations, etc.) between the vehicles 302a-302d. Although FIG. 3 shows that the vehicles 302a-302d communicate via the computing device 304, in some examples, the vehicles 302a-302d may additionally or alternatively communicate directly with one another.

The computing device 304 includes a communication system 306, a processor 308, and data storage 310. The communication system 306 may be any system configured to communicate with the vehicles 302a-302d, or other entities, either directly or via a communication network, such as a wireless communication network. For example, the communication system 306 may include an antenna and a chipset for wirelessly communicating with the vehicles 302a-302d, servers, or other entities either directly or via a wireless communication network. Alternatively, in some examples, the communication system 306 may include a wired connection to a server or other entity in wireless communication with the vehicles 302a-302d. Accordingly, the chipset or the communication system 306 in general may be arranged to communicate according to one or more types of wireless communication (e.g., protocols) such as Bluetooth, communication protocols described in IEEE 802.11 (including any IEEE 802.11 revisions), cellular technology (such as GSM, CDMA, UMTS, EV-DO, WiMAX, LTE, or 5th generation "5G" cellular), Zigbee, dedicated short range communications (DSRC), and radio frequency identification (RFID) communications, among other possibilities, or one or more types of wired communication such as Local Area Network (LAN), etc. The communication system 306 may take other forms as well.

The processor 308 may comprise one or more general-purpose processors and/or one or more special-purpose processors. To the extent the processor 308 includes more than one processor, such processors could work separately or in combination. Data storage 310, in turn, may comprise one or more volatile and/or one or more non-volatile storage components, such as optical, magnetic, and/or organic storage, and data storage 310 may be integrated in whole or in part with the processor 308.

In some embodiments, data storage 310 may contain instructions 312 (e.g., program logic) executable by the processor 308 to execute various functions described herein. Data storage 310 may contain additional instructions as well, including instructions to transmit data to, receive data from, interact with, and/or control one or more of the vehicles 302a-302d. The data storage may also include data related to the location of vehicles 302A-302D as well as sensor locations and sensor fields of view for vehicles 302A-302D. The computer system 210 may additionally or alternatively include components other than those shown.

Figure 4A:
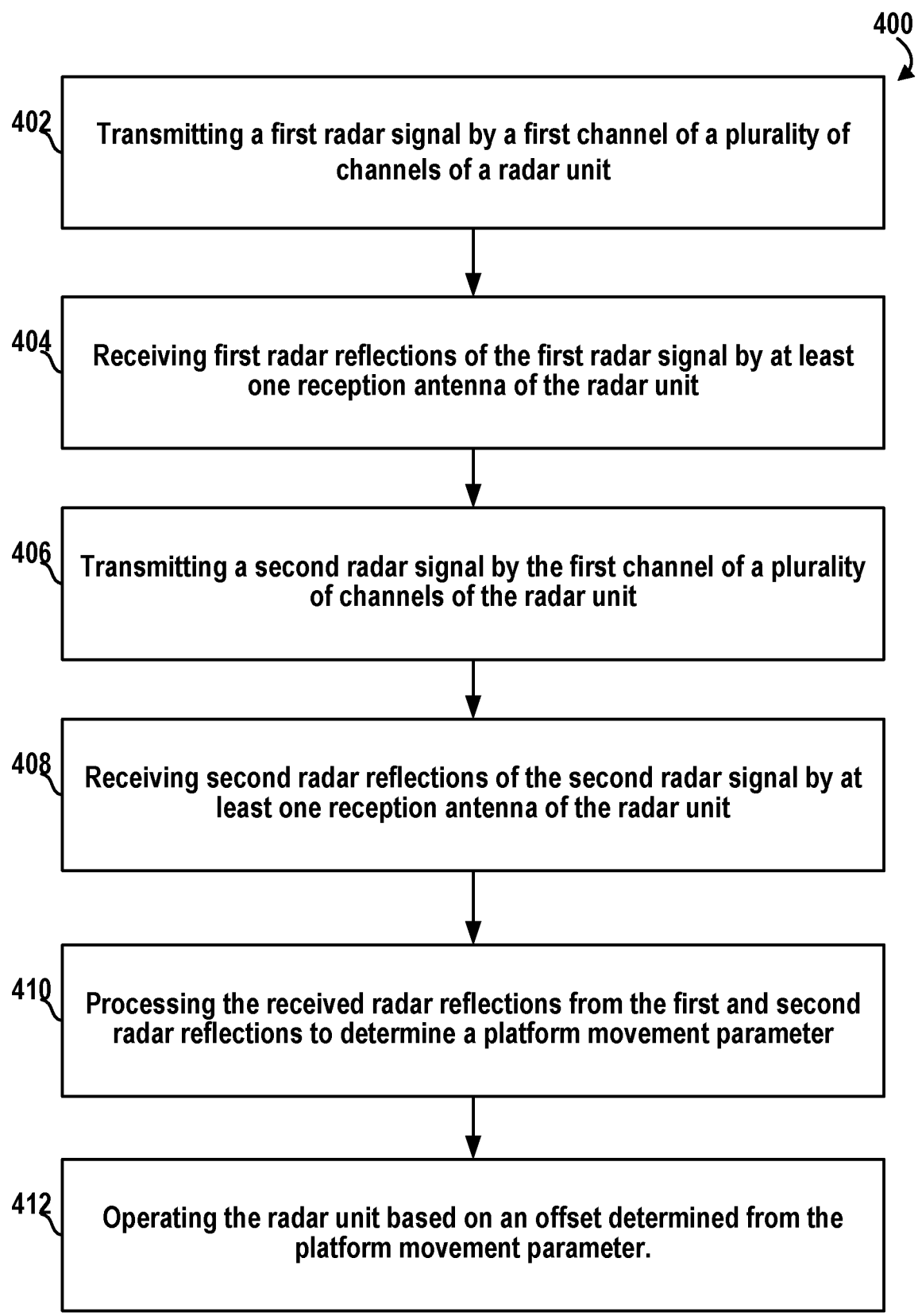
FIG. 4A is a block diagram of a method, according to an example embodiment.

FIG. 4A is a block diagram of a method 400, according to an example embodiment. Method 400 shown in FIG. 4A presents an embodiment of a method that could be used with the vehicles 100, 200, 250, 302a-302d, or the computing device 304, for example. Method 400 may also be used in conjunction with Method 450 of FIG. 4B. Method 400 may include one or more operations, functions, or actions as illustrated by one or more of blocks 402-412. Although the blocks are illustrated in a sequential order, these blocks may in some instances be performed in parallel, and/or in a different order than those described herein. Also, the various blocks may be combined into fewer blocks, divided into additional blocks, and/or removed based upon the desired implementation.

In addition, for the method 400 and other processes and methods disclosed herein, the flowchart shows functionality and operation of one possible implementation of present embodiments. In this regard, each block may represent a module, a segment, a portion of a manufacturing or operation process, or a portion of program code, which includes one or more instructions executable by a processor for implementing specific logical functions or steps in the process. The program code may be stored on any type of computer readable medium, for example, such as a storage device including a disk or hard drive. The computer readable medium may include non-transitory computer readable medium, for example, such as computer-readable media that stores data for short periods of time like register memory, processor cache and Random Access Memory (RAM). The computer readable medium may also include non-transitory media, such as secondary or persistent long term storage, like read only memory (ROM), optical or magnetic disks, compact-disc read only memory (CD-ROM), for example. The computer readable media may also be any other volatile or non-volatile storage systems. The computer readable medium may be considered a computer readable storage medium, for example, or a tangible storage device.

In addition, for the method 400 and other processes and methods disclosed herein, each block in FIG. 4A may represent circuitry that is wired to perform the specific logical functions in the process, for example. The method 400 may describe a method for determining a vehicle movement parameter and operating a radar system based on the determined vehicle movement parameter. In some examples, the method 400 may be performed while the vehicle is in motion.

At block 402, the method 400 includes transmitting a first radar signal by a first channel of a plurality of channels of a radar unit. The first channel that transmits the radar signal may be a physical channel of a radar unit. A physical channel may be a single antenna or single antenna array of the radar unit.

At block 404, the method 400 includes receiving first radar reflections of the first radar signal by at least one reception antenna of the radar unit. The transmitted radar signal from block 402 may reflect off various objects of the environment of the vehicle and be received by the at least one reception antenna. In some examples, the at least one reception antenna may correspond to a first reception channel that receives the radar signal may be a physical channel of a radar unit. The physical channel may be a single antenna or single antenna array of the radar unit.

At block 406, the method 400 includes transmitting a second radar signal by the first channel of a plurality of channels of the radar unit. The transmission of the second radar signal may be performed with the same channel that transmitted the prior radar signal at block 402. Thus, in some examples, block 406 of method 400 may be performed shortly after block 402 is performed. In some instances, block 406 may be performed immediately after block 402 (e.g., within milliseconds or seconds). In some other examples, block 406 may be performed after a period of time after block 402. The period of time may be a predetermined amount of time. In some examples, the period of time may be short, on the order of 10s of milliseconds.

In some examples, block 406 may also include transmitting radar signal on other channels as well. However, when block 406 transmits on more than one channel at once, the platform movement parameter is based only the transmissions and receptions on the first channel that transmitted at block 402. In some examples, when block 406 transmits on multiple channels, each channel may be transmitted with a coding or a frequency so that the channels do not interfere with one another.

At block 408, the method 400 includes receiving second radar reflections of the second radar signal by at least one reception antenna of the radar unit. As discussed at block 404, the transmitted radar signal from block 406 may reflect off various objects within the surrounding environment of the vehicle and subsequently received by the at least one reception antenna. In some examples, the at least one reception antenna may correspond to a first physical channel of a radar unit. The physical channel may be a single antenna or single antenna array of the radar unit.

In examples where block 406 transmitted multiple radar signals with multiple channels, block 406 may include receiving radar reflections associated with each of the transmitted radar signals. In some examples, a single array may receive all of the reflection signals from each transmission channel. In other examples, different arrays may receive the various reflection signals.

At block 410, the method 400 includes processing the received radar reflections from the first and second radar reflections to determine a platform movement parameter. The platform movement parameter may be representative of a movement of the vehicle between the first and second radar transmissions on the first channel. The platform movement parameter may be the velocity of the vehicle (and therefore the velocity of the radar unit). In some examples, the platform movement parameter may be the speed of the vehicle. By analyzing and comparing the reflected radar signals received at blocks 404 and 408, the system may be able to determine a movement of the platform between the two radar pulses. In some examples, when the same channel transmits twice in a row, the same signal should be received by the receiving antennas unless the scene has changed (in the time between pulses) or the platform has moved. In these instances, the radar reflections for the two virtual channels that overlap should be identical, except for effects caused by the movement of the vehicle platform. Thus, the system may be able to determine a platform movement parameter based on the differences in these two reflection signals.

In some examples, to aid in calculating the movement parameter, the system may determine a static object within the field of view of the radar. Static objects may include trees, street signs, light poles, etc. When the same static object is identified in both the first and second radar reflections, a movement of the vehicle may be calculated. In some additional examples, the vehicle may use other data sources, such as LIDAR data and/or map data to identify a static object. Once the static object is identified, its radar reflections may be determined in the first and second received radar signals.

At block 412, the method 400 includes operating the radar unit based on an offset determined from the platform movement parameter. Operating the radar unit includes transmitting and receiving more radar signals on the various channels of the radar system. Operating the radar system may also include transmitting and receiving radar signals with other radar units of the vehicle. In some examples, blocks 402-410 are performed once for the vehicle and the platform movement parameter is applied to all the radar units of the vehicle. In other examples, blocks 402-410 are performed once for each radar unit and the platform movement parameter is applied to the respective radar unit of the vehicle that did the transmitting and receiving. Thus, in some examples there may be a system-wide platform movement parameter and other examples may have a per-radar platform movement parameter.

Once the platform movement parameter is known, a processing system may be able to offset subsequent radar reflections based on the determined platform movement parameter. In practice, by offsetting based on the platform movement parameter, the system may be able to remove the effects of the movement of the vehicle platform from radar data. Thus, the radar data may be made more accurate by removing movement effects of the vehicle platform from the radar data.

In some examples, the radar system may operate in a time division multiple access (TDMA) operation mode. In TDMA, each channel may transmit in its own respective time frame. Thus, only one channel may transmit at any given time. Further, the channels may transmit in a predetermined order. Thus, at block 412, operating the radar unit may include transmitting and receiving on the plurality of channels in the predetermined channel order and processing the received radar signals based on the platform movement parameter.

In some other examples, the radar system may not operate in a TDMA mode and may use different signaling modes for each respective channel to provide signal orthogonality. In this example, the radar system may transmit on multiple channels simultaneously. The processing of the reflections from the multiple transmissions may also use the platform movement parameter to offset the radar data to mitigate platform movement effects.

Because the vehicle may change velocity while driving, the radar system may periodically calculate a new platform movement parameter. In some examples, the platform movement parameter may be recalculated after a predetermined amount of time, after a predetermined number of radar transmissions, when another vehicle system indicates a change in vehicle velocity above a threshold. Thus, blocks 402-410 may be repeated based on various criteria to keep the platform movement parameter updated.

Although blocks 402-410 are generally related to transmitting two pulses on one channel, blocks 402-410 are performed based on using a single reception channel in some examples. In the example described above, the radar unit may use one array to transmit radar signals and multiple channels to receive radar reflections. In this example, at blocks 402 and 406, the transmission array may transmit two radar pulses, and at blocks 404 and 408, a single physical reception channel may receive two sets of radar reflections. The platform movement parameter calculated at block 410 may be based on one physical reception channel receiving the two reflection signals.

Figure 4B:
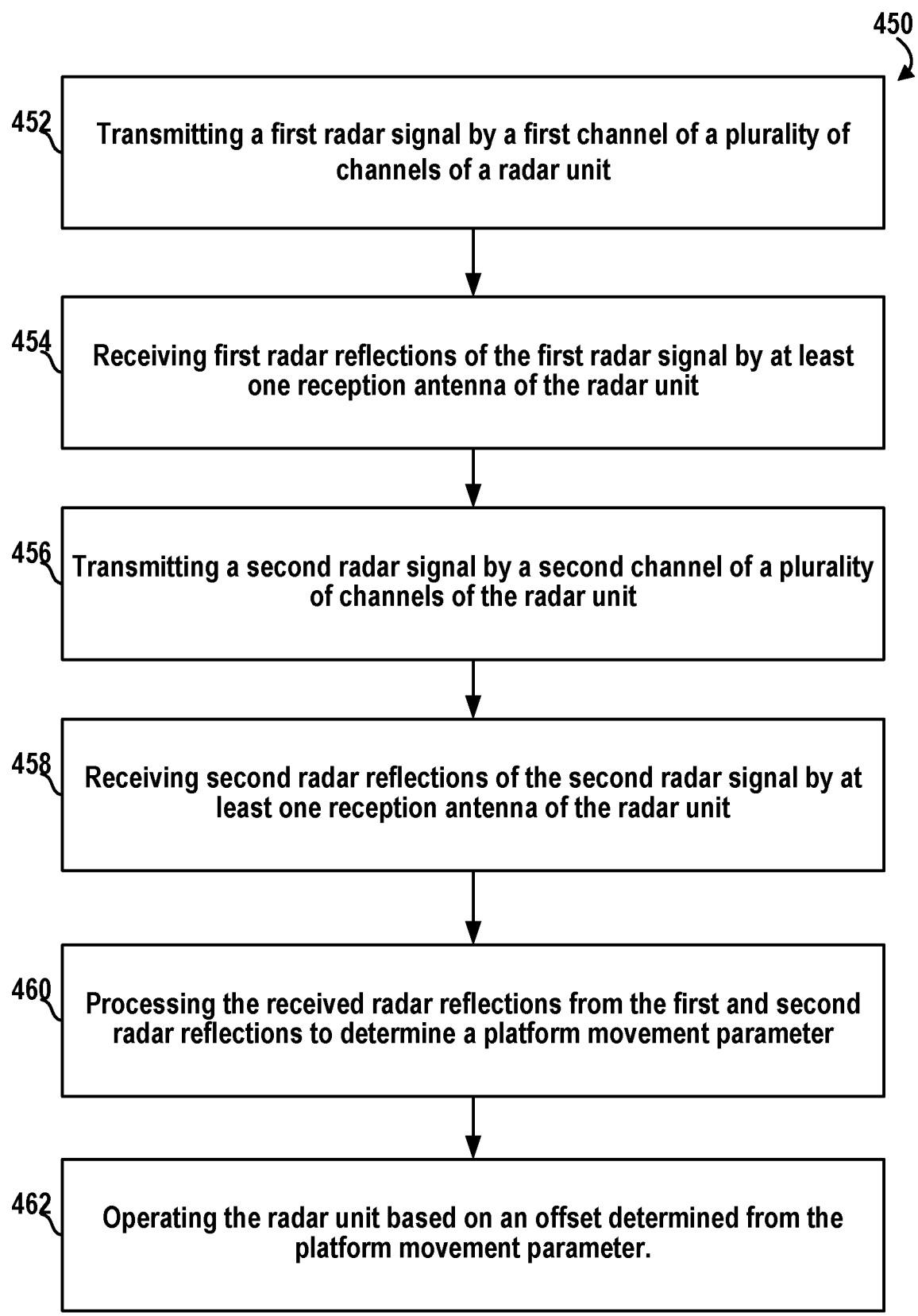
FIG. 4B is a block diagram of a method, according to an example embodiment.

FIG. 4B is a block diagram of a method 450, according to an example embodiment. Method 450 shown in FIG. 4B presents an embodiment of a method that could be used with the vehicles 100, 200, 250, 302a-302d, or the computing device 304, for example. Method 450 may also be used in conjunction with Method 400 of FIG. 4A. Method 450 may include one or more operations, functions, or actions as illustrated by one or more of blocks 452-462. Although the blocks are illustrated in a sequential order, these blocks may in some instances be performed in parallel, and/or in a different order than those described herein. Also, the various blocks may be combined into fewer blocks, divided into additional blocks, and/or removed based upon the desired implementation.

In addition, for the method 450 and other processes and methods disclosed herein, the flowchart shows functionality and operation of one possible implementation of present embodiments. In this regard, each block may represent a module, a segment, a portion of a manufacturing or operation process, or a portion of program code, which includes one or more instructions executable by a processor for implementing specific logical functions or steps in the process. The program code may be stored on any type of computer readable medium, for example, such as a storage device including a disk or hard drive. The computer readable medium may include non-transitory computer readable medium, for example, such as computer-readable media that stores data for short periods of time like register memory, processor cache and Random Access Memory (RAM). The computer readable medium may also include non-transitory media, such as secondary or persistent long term storage, like read only memory (ROM), optical or magnetic disks, compact-disc read only memory (CD-ROM), for example. The computer readable media may also be any other volatile or non-volatile storage systems. The computer readable medium may be considered a computer readable storage medium, for example, or a tangible storage device.

In addition, for the method 450 and other processes and methods disclosed herein, each block in FIG. 4B may represent circuitry that is wired to perform the specific logical functions in the process, for example. The method 450 may describe a method for determining a vehicle movement parameter and operating a radar system based on the determined vehicle movement parameter. In some examples, the method 450 may be performed while the vehicle is in motion.

At block 452, the method 450 includes transmitting a first radar signal by a first channel of a plurality of channels of a radar unit. The first channel that transmits the radar signal may be a physical channel of a radar unit. A physical channel may be a single antenna or single antenna array of the radar unit.

At block 454, the method 450 includes receiving first radar reflections of the first radar signal by at least one reception antenna of the radar unit. The transmitted radar signal from block 452 may reflect off various objects of the environment of the vehicle and be received by the at least one reception antenna. In some examples, the at least one reception antenna may correspond to a first reception channel that receives the radar signal may be a physical channel of a radar unit. The physical channel may be a single antenna or single antenna array of the radar unit. In some examples, the radar unit may have a single reception array for receiving radar reflection signals.

At block 456, the method 450 includes transmitting a second radar signal by a second channel of a plurality of channels of the radar unit. The transmission of the second radar signal may be performed with different channel that transmitted the prior radar signal at block 452. In some examples, block 456 of the method 450 may be performed shortly after block 452 is performed. In some instances, block 456 may be performed immediately after block 452 (e.g., within milliseconds or seconds). In some other examples, block 456 may be performed after a period of time after block 452. The period of time may be a predetermined amount of time. In some examples, the period of time may be short, on the order of 10s of milliseconds.

At block 458, the method 450 includes receiving second radar reflections of the second radar signal by at least one reception antenna of the radar unit. As discussed at block 454, the transmitted radar signal from block 456 may reflect off various objects within the surrounding environment of the vehicle and subsequently received by the at least one reception antenna. In some examples, the at least one reception antenna may correspond to a first reception channel that receives the radar signal may be a physical channel of a radar unit. The physical channel may be a single antenna or single antenna array of the radar unit.

At block 460, the method 450 includes processing the received radar reflections from the first and second radar reflections to determine a platform movement parameter. The platform movement parameter may be representative of a movement of the vehicle between the first and second radar transmissions. The platform movement parameter may be the velocity of the vehicle (and therefore the velocity of the radar unit). In some examples, the platform movement parameter may be the speed of the vehicle. By analyzing and comparing the reflected radar signals received at blocks 454 and 458, the system may be able to determine a movement of the platform between the two radar pulses.

Figure 7:
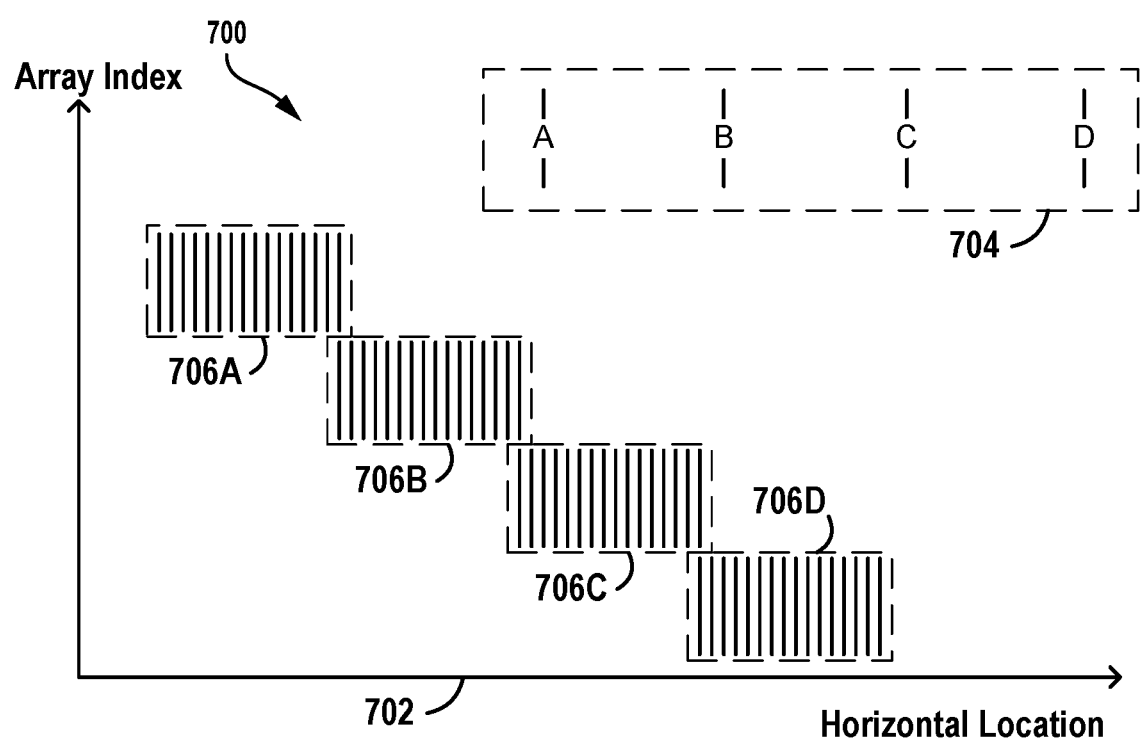
FIG. 7 illustrates example radar channel operation and a virtual array of an example radar system.

As part of block 460, the system may form a virtual array (explained further with respect to FIG. 7). A virtual array is an array that is a compilation of the reflections from the transmitted signals including an offset based on the spacing the physical elements that transmit the radar signals. In some examples, the virtual array may have one (or more) virtual elements that correspond to the same location. Such as when the spacing of transmitting antennas causes a first virtual array to have one or more elements overlap in position with elements of a second virtual array. In these instances, the radar reflections for the two virtual channels that overlap should be identical, except for effects caused by the movement of the vehicle platform. Thus, the system may be able to determine a platform movement parameter based on the differences in these two reflection signals.

In some examples, to aid in calculating the movement parameter, the system may determine a static object within the field of view of the radar. Static objects may include trees, street signs, light poles, etc. When the same static object is identified in both the first and second radar reflections, a movement of the vehicle may be calculated. In some additional examples, the vehicle may use other data sources, such as LIDAR data and/or map data to identify a static object. Once the static object is identified, its radar reflections may be determined in the first and second received radar signals.

At block 462, the method 450 includes operating the radar unit based on an offset determined from the platform movement parameter. Operating the radar unit includes transmitting and receiving more radar signals on the various channels of the radar system. Operating the radar system may also include transmitting and receiving radar signals with other radar units of the vehicle. In some examples, blocks 452-460 are performed once for the vehicle and the platform movement parameter is applied to all the radar units of the vehicle. In other examples, blocks 452-460 are performed once for each radar unit and the platform movement parameter is applied to the respective radar unit of the vehicle that did the transmitting and receiving. Thus, in some examples there may be a system-wide platform movement parameter and other examples may have a per-radar platform movement parameter.

Once the platform movement parameter is known, a processing system may be able to offset subsequent radar reflections based on the determined platform movement parameter. In practice, by offsetting based on the platform movement parameter, the system may be able to remove the effects of the movement of the vehicle platform from radar data. Thus, the radar data may be made more accurate by removing movement effects of the vehicle platform from the radar data.

In some examples, the radar system may operate in a time division multiple access (TDMA) operation mode. In TDMA, each channel may transmit in its own respective time frame. Thus, only one channel may transmit at any given time. Further, the channels may transmit in a predetermined order. Thus, at block 462, operating the radar unit may include transmitting and receiving on the plurality of channels in the predetermined channel order and processing the received radar signals based on the platform movement parameter.

In some other examples, the radar system may not operate in a TDMA mode and may use different signaling modes for each respective channel to provide signal orthogonality. In this example, the radar system may transmit on multiple channels simultaneously. The processing of the reflections from the multiple transmissions may also use the platform movement parameter to offset the radar data to mitigate platform movement effects.

Because the vehicle may change velocity while driving, the radar system may periodically calculate a new platform movement parameter. In some examples, the platform movement parameter may be recalculated after a predetermined amount of time, after a predetermined number of radar transmissions, when another vehicle system indicates a change in vehicle velocity above a threshold. Thus, blocks 452-460 may be repeated based on various criteria to keep the platform movement parameter updated.

Although blocks 452-460 are generally described with respect to transmitting on different channels and receiving with one array, in some other examples, blocks 452-460 may be performed with a single transmit array and varied receive arrays performed based on using a single reception channel in some examples. In the example described above, the radar unit may use one array to transmit radar signals and multiple channels to receive radar reflections. In this example, at blocks 452 and 456, the transmission array may transmit radar pulses, and at blocks 454 and 458, a virtual array may be created with different receiver arrays. The platform movement parameter calculated at block 410 may be based on a virtual array based on varied reception arrays.

In some examples, the system may perform methods 400 and 450 at the same time. As one example, the transmitting twice on one channel of method 400 may be combined with creating a virtual array of method 450 to calculate a platform movement parameter. In practice, the system may initially calculate a movement parameter based on either method 400 or 450. The system may subsequently perform either method 400 or 450 to revise the platform movement parameter. In some examples, the system may periodically or continuously revise the platform movement parameter. In some additional examples, the system may also control the operation and/or movement of the autonomous vehicle as part of method 400 and/or method 450.

Figure 5:
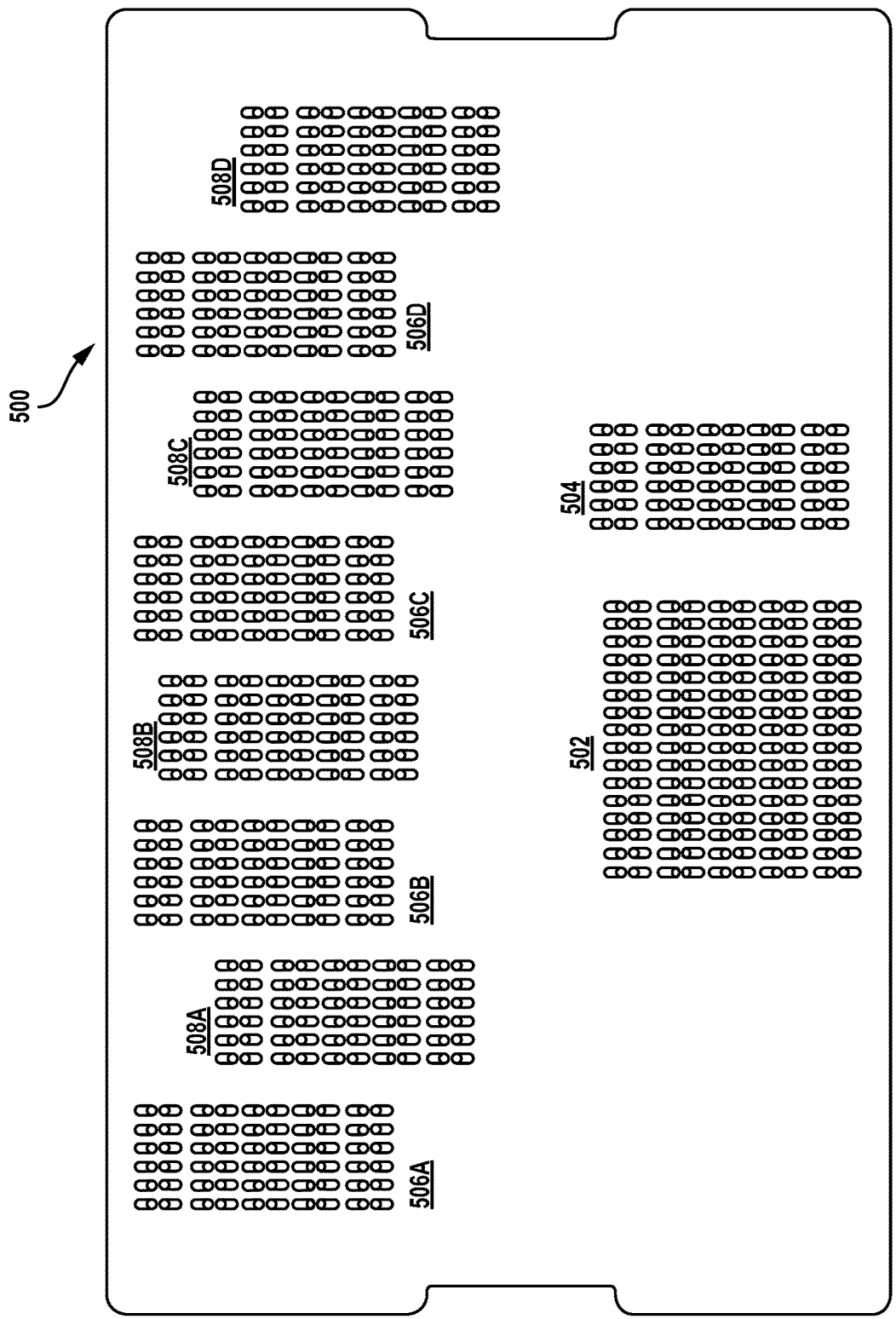
FIG. 5 illustrates an example radar antenna having multiple channels, according to an example embodiment.

Referring now to the figures, FIG. 5 illustrates an example radar antenna 500 having multiple channels. It should be understood that other layouts and arrangements of the various elements are possible as well. For example, it should also be understood that a given application of such an antenna may determine appropriate dimensions and sizes for various machined portions of the two metal layers described above (e.g., channel size, metal layer thickness, etc.) and/or for other machined (or non-machined) portions/components of the antenna described herein. For instance, as discussed above, some example radar systems may be configured to operate at an electromagnetic wave frequency centered at approximately 77 GHz (e.g., W-band or M-band energy), which corresponds to millimeter electromagnetic wavelength. At this frequency, the channels, ports, etc. of an apparatus may be of given dimensions appropriate for the 77 GHz frequency. Other example antennas and antenna applications are possible as well.

The radar antenna architecture 500 may be a top view of a split-block construction antenna unit. FIG. 5 shows a view of the top surface of a top block. The top surface of the block contains a plurality of antenna apertures. In the example radar antenna architecture 500, the antenna apertures may be arranged in a plurality of arrays. In various other examples, the size, shape, location, and function of the various arrays may be different than that shown in FIG. 5.

The example radar antenna architecture 500 includes a uniform linear array 502 for receiving radar signals. The uniform linear array 502 may be configured as a sixteen by ten array of antenna elements. The example radar antenna architecture 500 also includes a reception array 504. For instance, the reception array 504 may be configured as a six by ten array of antenna elements. The example radar antenna architecture 500 also includes four MIMO transmission antenna arrays 506A-506D. Each MIMO array may be configured as a six by ten array. Further, the example radar antenna architecture 500 includes four transmission antenna arrays 508A-508D, each array configured as a six by ten array. Although the present arrays are described as transmission or reception arrays, in other examples, their functionality may take the opposite form. For example, an array described as a transmission array may be a reception array in some examples and an array described as a reception array may be a transmission array in some examples. In yet some further examples, an array may be able to both transmit and receive radar signals.

Additionally, each of MIMO transmission antenna arrays 506A-506D and transmission array 508A-508D may be a different physical channel. Thus, in one example, the present disclosure may have the radar unit transmit a first pulse with array 506A and a second pulse with array 506A to determine the platform movement parameter. In other examples, other arrays may be used to transmit the first two pulses to determine the radar movement parameter.

During the operation of the radar system, each MIMO transmission array 506A-506D of the example radar antenna architecture 500 may have a beamwidth of approximately 90 degrees and each transmission array 508A-508D of the example radar antenna architecture 500 may have a beamwidth of approximately 45 degrees. Both the uniform linear array 502 and the reception array 504 may have a beam that is electronically steerable. In some examples, the uniform linear array 502 and the reception array 504 may be able to scan their respective beams over 22.5, 45, or 90 degrees. In some examples, each transmission array 508A-508D may be pointed at a particular angle (e.g., an angle of 22.5 degrees).

To operate in a MIMO mode, a radar system of the vehicle may transmit and receive multiple radar pulses. The radar pulses may be transmitted and received from a plurality of different antenna apertures (e.g. antenna arrays). The term MIMO comes from a radar system having multiple inputs and multiple outputs. It may be desirable for each of the multiple input antennas and each of the multiple output antennas to operate uncoupled (that receives a separate diverse signal) from each other respective input and output antenna. A radar may have MIMO capabilities in multiple ways. First, spatial diversity (i.e. a difference between physical location) of radar transmitters (and/or receivers) may enable MIMO functionality. Second, coding diversity may enable a radar system to transmit a signal that has a respective coding. The coding may include multiple signals that are orthogonal to each other so virtual diverse channels can be created. In some system, a combination of spatial diversity and coding diversity may be used to establish the MIMO diversity. Yet, additionally, TDMA can provide time diversity to allow multiple transmission and reception antennas to be used. Also, in other examples, a frequency division multiple access (FDMA) may also be used for diversity.

Other scenarios are possible as well in accordance with the present disclosure.

Figure 6A:
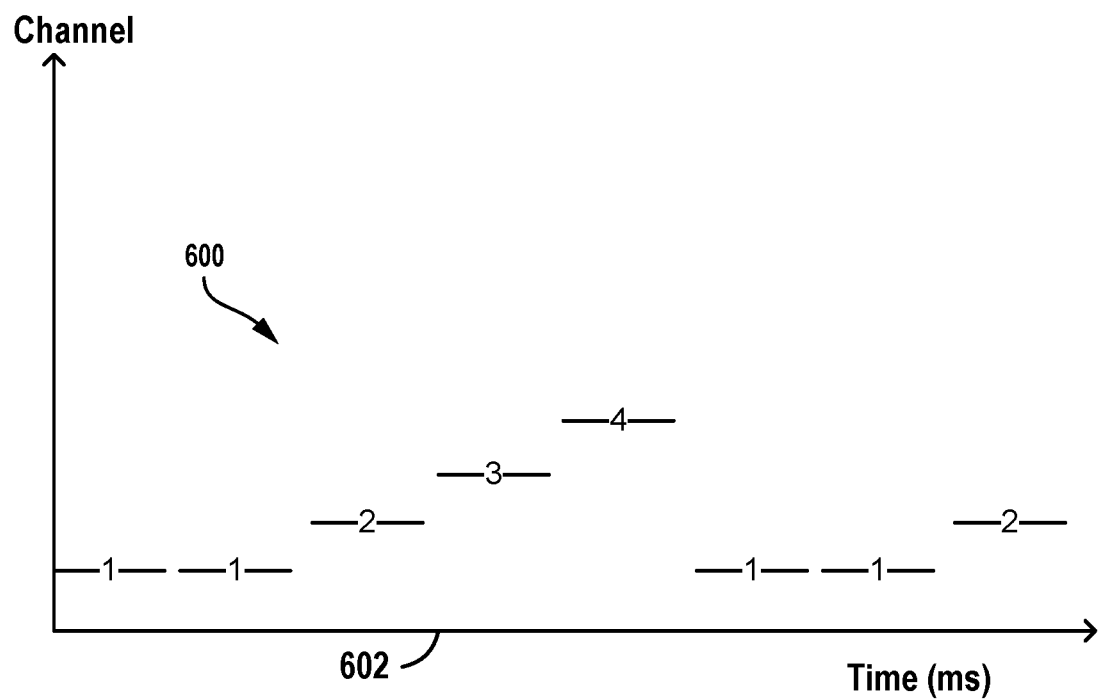
FIG. 6A illustrates example radar channel transmissions or receptions of an example radar system.

FIG. 6A illustrates example radar channel transmissions or receptions 600 of an example radar system operating in a TDMA mode. As shown in FIG. 6A, a radar system may have four physical channels. The transmissions or receptions by the four channels of the radar system indexed based on time 602. As previously discussed, in some examples, the radar system may operate by controlling which physical channel of a plurality of physical channels transmits during any given time slot. In another example, the radar system may operate by controlling which physical channel of a plurality of physical channels receives during any given time slot.

As shown in FIG. 6A, during the first time slot, the radar unit may operate on the first physical channel. During the second time slot, the radar unit may again operate on the first physical channel. By operating on the same physical channel twice in a row, the system may be able to determine the platform movement parameter. In the third through fifth time slots, the radar unit may operate on the second, third, and fourth physical channels, respectively. The system may then repeat the channel transmission order. The system may continue to repeat this order until it is instructed to do otherwise.

The example radar channel transmissions or receptions 600 are one possible example of a TDMA scheme of the present disclosure. In some examples, the order of channels may not repeat the same order with the second set of transmissions or receptions. In other examples, a different channel, other than the first channel, may be used to determine the platform movement parameter. In some other examples, the system may use different channels with each set of transmissions or receptions to determine the platform movement parameter. In yet other examples, the system may not perform two transmissions or receptions to determine the platform movement parameter with each set of transmissions or receptions. Various other arrangements of TDMA channel order as well, within the context of the present disclosure. Additionally, systems may have more or fewer than four channels as well.

Figure 6B:
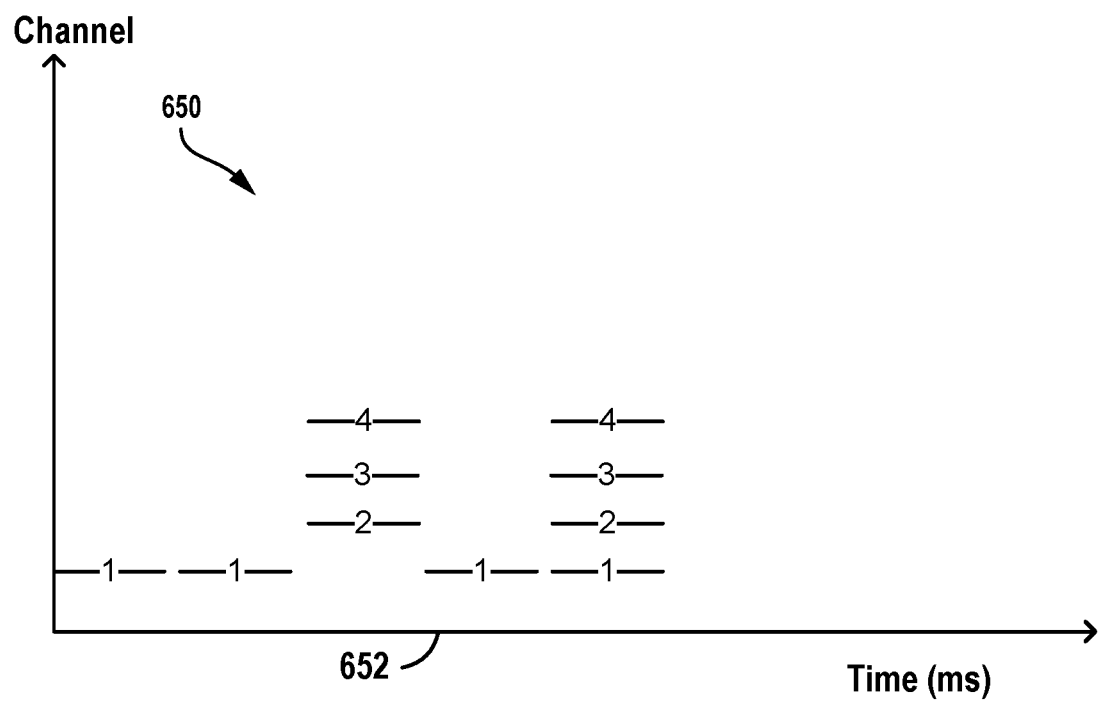
FIG. 6B illustrates example radar channel transmissions or receptions of an example radar system.

FIG. 6B illustrates example radar channel transmissions or receptions 650 of an example radar system. The radar channel transmissions or receptions 650 may be based on a coding scheme that allows channels to maintain their orthogonality. When channels are orthogonal, they may be able to be transmitted and/or receive simultaneously without interfering with one another. For example, each channel may transmit or receive based on a respective coding unique to that channel. Thus, when reflects are received, the unique codings may be used to resolve the different channels.

As shown in FIG. 6B, a radar system may have four physical channels. The transmissions or receptions by the four channels of the radar system indexed based on time 652. As shown in FIG. 6B, the system may operate in two different modes. In one mode, during the first time slot, the radar unit may operate on the first physical channel and during the second time slot, the radar unit may again operate on the first physical channel. By operating on the same physical channel twice in a row, the system may be able to determine the platform movement parameter. Then, in the third time slot, the radar unit may operate on the second, third, and fourth physical channels, simultaneously. The system may then repeat the channel transmission or reception order. The system may continue to repeat this order until it is instructed to do otherwise.

In the second mode, the system may operate on the first channel during the first time slot. In the second time slot the system may operate on all four channels at the same time. The system may be able to determine the platform movement parameter based on the first channel being operated on twice, while also operating on the other channels.

The example radar channel transmissions or receptions 650 are two possible examples of a multiple-channel scheme of the present disclosure. In some examples, the number of channels may be a subset of all the channels, rather than the full set of channels (or the full set minus the channel that was repeated twice). In other examples, a different channel, other than the first channel, may be used to determine the platform movement parameter. In some other examples, the system may use different channels with each set of transmissions or receptions to determine the platform movement parameter. In yet other examples, the system may not perform two transmissions or receptions to determine the platform movement parameter with each set of transmissions or receptions. Additionally, systems may have more or fewer than four channels as well.

FIG. 7 illustrates example radar channel operation and a virtual array 700 of an example radar system. As shown in FIG. 7, a virtual array may have a horizontal location 702 of antenna elements. The virtual array includes transmission array 704, comprising transmission elements A-D. Each of transmission elements A-D may be a single antenna or a sub-array of multiple antennas. The virtual array 700 also includes four reception arrays 706A-706D. Each reception array comprises a plurality of antenna elements, each of which may be a single antenna antenna or a sub array of antennas. In some examples, the transmission array 704 and/or the reception arrays 706A-706D may include more or fewer antenna elements and/or subarrays.

The virtual array 700 is shown with an array index on the vertical axis, the array index is provided so more easily show the respective arrays of the virtual array 700. The vertical axis is not meant to imply that there is a vertical spacing of the arrays. For example, each of arrays 706A-706D may be in the same vertical plane in the virtual array. Additionally, reception arrays 706A-706D may all correspond to one physical antenna array (which may include multiple subarrays) on a radar unit. Each reception array of reception arrays 706A-706D corresponds to a respective transmission by one of the transmission elements A-D of the transmission array 704. Moreover, in some examples, the functionality of the transmission array 704 and the reception arrays 706A-706D may be swapped. That is, the transmission array 704 may be used to receive signals and the reception arrays 706A-706D may be used to transmit signals.

In practice, the virtual array 700 may be formed by a respective transmission of one of the elements of the transmission array 704 and reception by a receiving array to form one of the reception arrays 706A-706D of the virtual array 700. As one example, during operation of the antenna system, element A of transmission array 704 may transmit a radar pulse. When the pulse from element A is received by the receiving physical array, the radar system may treat the receptions as a virtual array 706A.

The next subsequent pulse may be transmitted by element B of transmission array 704. When the pulse from element B is received by the receiving physical array, the radar system may treat the receptions as a virtual array 706B. Due to the spacing between elements A and B of the transmission array 704, the virtual locations of the receive array may be shifted by a distance equal to the physical distance separation of elements A and B of transmission array 704. Thus, the furthest right element of virtual array 706A may have the same virtual location as the furthest left element of virtual array 706B.

The next subsequent pulse may be transmitted by element C of transmission array 704. When the pulse from element C is received by the receiving physical array, the radar system may treat the receptions as a virtual array 706C. Due to the spacing between elements B and C of the transmission array 704, the virtual locations of the receive array may be shifted by a distance equal to the physical distance separation of elements B and C of transmission array 704. Thus, the furthest right element of virtual array 706B may have the same virtual location as the furthest left element of virtual array 706C.

The next subsequent pulse may be transmitted by element D of transmission array 704. When the pulse from element D is received by the receiving physical array, the radar system may treat the receptions as a virtual array 706D. Due to the spacing between elements C and D of the transmission array 704, the virtual locations of the receive array may be shifted by a distance equal to the physical distance separation of elements C and D of transmission array 704. Thus, the furthest right element of virtual array 706C may have the same virtual location as the furthest left element of virtual array 706D.

Thus, when signals are received across the virtual arrays 706A-706D, there may be at least one element of two subsequent virtual arrays that maps to the same physical location. In some examples, the spacing may be varied to have more overlap than just one element.

In operation, the differences in radar reflections between two antenna elements that map to the same physical location may correspond to changes caused by a movement of the platform (e.g., vehicle movements) rather than changes in the environment. Therefore, the system may also use the overlapping virtual elements to determine a movement parameter for the platform. In some examples, the system may use both the transmission patterns (such as those described with respect to FIGS. 4A, 6A, and 6B) along with the virtual arrays described with respect to FIGS. 4B and 7 to determine a platform movement parameter.

Figure 8:
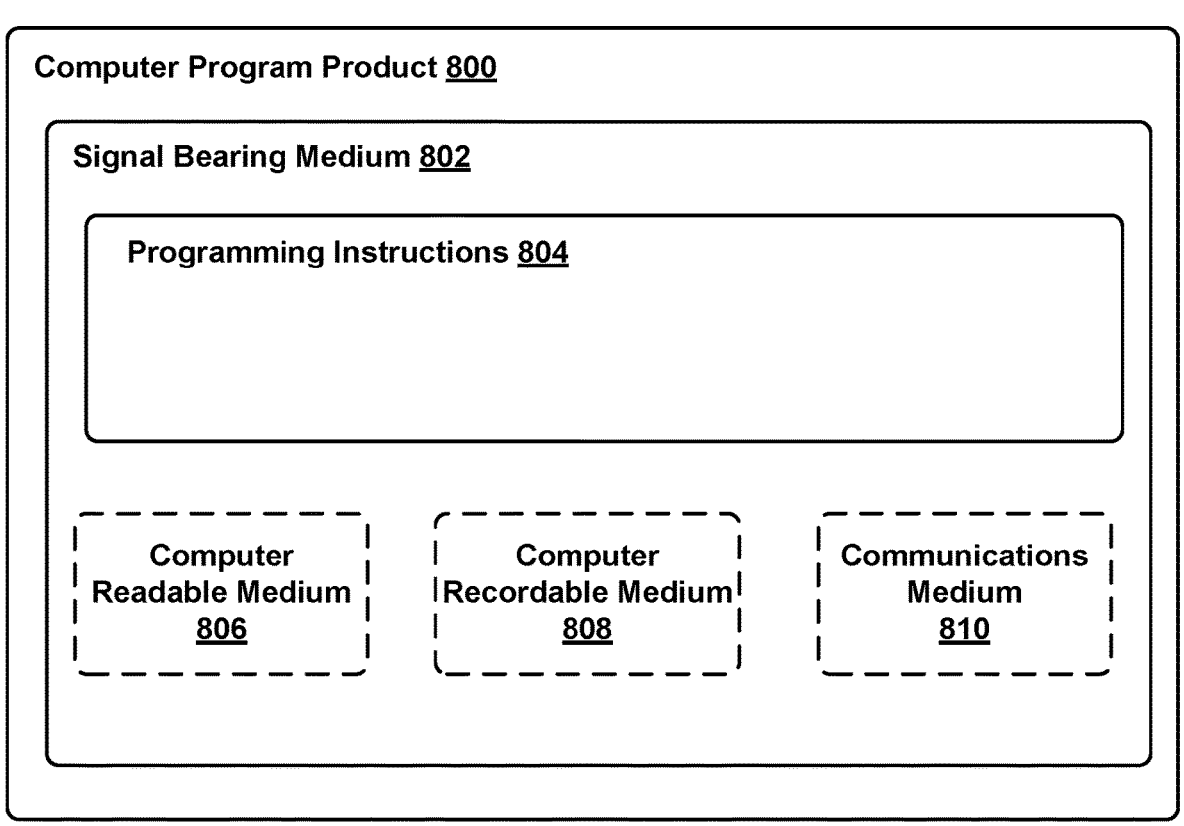
FIG. 8 depicts an example computer readable medium configured according to an example embodiment.

FIG. 8 depicts an example computer readable medium configured according to an example embodiment. In example embodiments, an example system may include one or more processors, one or more forms of memory, one or more input devices/interfaces, one or more output devices/interfaces, and machine readable instructions that when executed by the one or more processors cause the system to carry out the various functions tasks, capabilities, etc., described above.

As noted above, in some embodiments, the disclosed techniques (e.g., methods 400, etc.) may be implemented by computer program instructions encoded on a computer readable storage media in a machine-readable format, or on other media or articles of manufacture (e.g., instructions 216 of the vehicle 200, instructions 312 of the computing device 304, etc.). FIG. 8 is a schematic illustrating a conceptual partial view of an example computer program product that includes a computer program for executing a computer process on a computing device, such as on a radar planning system, arranged according to at least some embodiments disclosed herein.

In one embodiment, the example computer program product 800 is provided using a signal bearing medium 802. The signal bearing medium 802 may include one or more programming instructions 804 that, when executed by one or more processors may provide functionality or portions of the functionality described above with respect to FIGS. 1-9. In some examples, the signal bearing medium 802 may be a computer-readable medium 806, such as, but not limited to, a hard disk drive, a Compact Disc (CD), a Digital Video Disk (DVD), a digital tape, memory, etc. In some implementations, the signal bearing medium 802 may be a computer recordable medium 808, such as, but not limited to, memory, read/write (R/W) CDs, R/W DVDs, etc. In some implementations, the signal bearing medium 802 may be a communication medium 810 (e.g., a fiber optic cable, a waveguide, a wired communications link, etc.). Thus, for example, the signal bearing medium 802 may be conveyed by a wireless form of the communications medium 810.

The one or more programming instructions 804 may be, for example, computer executable and/or logic implemented instructions. In some examples, a computing device may be configured to provide various operations, functions, or actions in response to the programming instructions 804 conveyed to the computing device by one or more of the computer readable medium 806, the computer recordable medium 808, and/or the communications medium 810.

The computer readable medium 806 may also be distributed among multiple data storage elements, which could be remotely located from each other. The computing device that executes some or all of the stored instructions could be an external computer, or a mobile computing platform, such as a smartphone, tablet device, personal computer, wearable device, etc. Alternatively, the computing device that executes some or all of the stored instructions could be remotely located computer system, such as a server, or a distributed cloud computing network.

It should be understood that arrangements described herein are for purposes of example only. As such, those skilled in the art will appreciate that other arrangements and other elements (e.g. machines, interfaces, functions, orders, and groupings of functions, etc.) can be used instead, and some elements may be omitted altogether according to the desired results. Further, many of the elements that are described are functional entities that may be implemented as discrete or distributed components or in conjunction with other components, in any suitable combination and location, or other structural elements described as independent structures may be combined.

While various aspects and embodiments have been disclosed herein, other aspects and embodiments will be apparent to those skilled in the art. The various aspects and embodiments disclosed herein are for purposes of illustration and are not intended to be limiting, with the true scope being indicated by the following claims, along with the full scope of equivalents to which such claims are entitled. It is also to be understood that the terminology used herein is for the purpose of describing particular embodiments only, and is not intended to be limiting.

What is claimed is:

1. A radar system comprising:
    a radar unit comprising a plurality of physical channels configured to:
        transmit a radar signal by a given channel of the plurality of channels, and
        receive radar reflections; and
    a radar processing system configured to:
        cause a plurality of transmissions of radar signals by the radar unit, each transmission of the plurality of transmissions being transmitted by one of the plurality of channels, wherein the plurality of transmissions of radar signals are transmitted in a predetermined channel order and wherein two consecutive transmissions are transmitted by one channel of the plurality of channels,
        process received radar reflections from the two consecutive transmissions that are transmitted by one channel of the plurality of channels to determine a platform movement parameter,
        create a virtual array, wherein the virtual array comprises signals received by a reception array of the radar unit,
        determine first and second virtual array elements that correspond to a same virtual location,
        process received radar reflections from the first and second virtual array elements to revise the platform movement parameter, and
        operate the radar system based on an offset determined from the platform movement parameter.

2. The radar system of claim 1, wherein the radar unit comprises at least one transmission antenna for each channel of the plurality of channels.

3. The radar system of claim 1, wherein the radar unit is coupled to a vehicle, and
    wherein the platform movement parameter is determined based on calculating a movement of the vehicle between each of the two consecutive transmissions that are transmitted by one channel of the plurality of channels.

4. The radar system of claim 1, wherein the radar unit comprises a set of transmission antennas and a set of reception antennas, wherein the set of transmission antennas and the set of reception antennas are different antennas.

5. The radar system of claim 1, further comprising a plurality of additional radar units, wherein each of the plurality of radar units operate based on the offset determined from the platform movement parameter.

6. A method comprising:
    transmitting a first radar signal by a first channel of a plurality of channels of a radar unit;
    receiving first radar reflections of the first radar signal by at least one reception antenna of the radar unit;
    transmitting a second radar signal by the first channel of a plurality of channels of the radar unit;
    receiving second radar reflections of the second radar signal by at least one reception antenna of the radar unit;
    processing the received radar reflections from the first and second radar reflections to determine a platform movement parameter;
    creating a virtual array, wherein the virtual array comprises signals received by a reception array of the radar unit;
    determining first and second virtual array elements that correspond to a same virtual location;
    processing received radar reflections from the first and second virtual array elements to revise the platform movement parameter; and
    operating the radar unit based on an offset determined from the platform movement parameter.

7. The method of claim 6, wherein operating the radar unit further comprises transmitting radar signals from the radar unit in a predetermined channel order.

8. The method of claim 7, further comprising determining the predetermined channel order.

9. The method of claim 6, wherein each channel of the plurality of channels comprises at least one transmission antenna.

10. The method of claim 6, wherein each channel of the plurality of channels comprises an array of antennas.

11. The method of claim 6, wherein the radar system is coupled to a vehicle; and wherein the method further comprises:
    calculating the platform movement parameter based on a movement of the vehicle between transmitting the first radar signal and transmitting the second radar signal.

12. The method of claim 6, wherein receiving radar reflections is performed by a reception array.

13. The method of claim 6, wherein the transmitting is performed by a set of transmission antennas and the receiving is performed by a set of reception antennas, wherein the set of transmission antennas and the set of reception antennas are different antennas.

14. A non-transitory computer-readable medium having stored thereon executable instructions that, upon execution by a computing device, cause the computing device to perform functions comprising:
    causing a transmission of a first radar signal by a first channel of a plurality of channels of a radar unit;
    receiving first radar reflections of the first radar signal;
    causing a transmission of a second radar signal by the first channel of a plurality of channels of the radar unit;
    receiving second radar reflections;
    processing the received radar reflections from the first and second radar reflections to determine a platform movement parameter;
    creating a virtual array, wherein the virtual array comprises signals received by a reception array of the radar unit;
    determining a first and second virtual array elements that correspond to a same virtual location;
    processing received radar reflections from the first and second virtual array elements to revise the platform movement parameter; and operating the radar unit based on an offset determined from the platform movement parameter.

15. The non-transitory computer-readable medium of claim 14, wherein the instructions for operating the radar further comprise instructions for causing the transmission of radar signals from the radar unit in a predetermined channel order.

16. The non-transitory computer-readable medium of claim 14, further comprising instructions for calculating the platform movement parameter based on a movement of a vehicle between transmitting the first radar signal and transmitting the second radar signal.

17. The non-transitory computer-readable medium of claim 14, wherein operating the radar unit further comprises transmitting radar signals from the radar unit in a predetermined channel order.

18. The non-transitory computer-readable medium of claim 17, further comprising instructions for determining the predetermined channel order.

19. The non-transitory computer-readable medium of claim 14, wherein each channel of the plurality of channels comprises at least one transmission antenna.

20. The non-transitory computer-readable medium of claim 14, wherein each channel of the plurality of channels comprises an array of antennas.

\* \* \* \* \*